US008180834B2

(12) United States Patent
Kay et al.

(10) Patent No.: US 8,180,834 B2
(45) Date of Patent: May 15, 2012

(54) SYSTEM, METHOD, AND COMPUTER PROGRAM PRODUCT FOR FILTERING MESSAGES AND TRAINING A CLASSIFICATION MODULE

(75) Inventors: Erik Andrew Kay, Foster City, CA (US); David Moore, San Francisco, CA (US); Daniel L. Willhite, San Francisco, CA (US); Linus Upson, Redwood City, CA (US)

(73) Assignee: Computer Associates Think, Inc., Islandia, NY (US)

( * ) Notice: Subject to any disclaimer, the term of this patent is extended or adjusted under 35 U.S.C. 154(b) by 771 days.

(21) Appl. No.: 11/245,101

(22) Filed: Oct. 7, 2005

(65) Prior Publication Data

US 2006/0095524 A1 May 4, 2006

Related U.S. Application Data

(60) Provisional application No. 60/616,432, filed on Oct. 7, 2004.

(51) Int. Cl.
*G06F 15/16* (2006.01)
(52) U.S. Cl. ........................................ 709/206; 709/203
(58) Field of Classification Search ........... 709/204–207
See application file for complete search history.

(56) References Cited

U.S. PATENT DOCUMENTS

| | | |
|---|---|---|
| 5,226,079 A | 7/1993 | Holloway |
| 5,999,932 A | 12/1999 | Paul |
| 6,023,723 A | 2/2000 | McCormick et al. |
| 6,112,227 A | 8/2000 | Heiner |
| 6,115,376 A | 9/2000 | Sherer et al. |
| 6,199,102 B1 | 3/2001 | Cobb |
| 6,249,805 B1 | 6/2001 | Fleming, III |
| 6,321,267 B1 | 11/2001 | Donaldson |
| 6,421,709 B1 | 7/2002 | McCormick et al. |
| 6,442,686 B1 | 8/2002 | McArdle et al. |
| 6,654,787 B1 * | 11/2003 | Aronson et al. ............... 709/206 |
| 6,691,156 B1 | 2/2004 | Drummond et al. |
| 6,772,196 B1 | 8/2004 | Kirsch et al. |
| 6,804,704 B1 | 10/2004 | Bates et al. |
| 6,865,671 B1 | 3/2005 | Assmann |
| 6,868,436 B1 | 3/2005 | Fleming, III |
| 7,219,148 B2 * | 5/2007 | Rounthwaite et al. ........ 709/224 |
| 7,653,698 B2 * | 1/2010 | Wieneke et al. ............... 709/206 |
| 2002/0141592 A1 | 10/2002 | Aull |
| 2003/0050988 A1 | 3/2003 | Kucherawy |
| 2003/0074413 A1 | 4/2003 | Nielsen et al. |
| 2003/0110400 A1 | 6/2003 | Cartmell et al. |
| 2003/0172291 A1 | 9/2003 | Judge et al. |
| 2003/0172294 A1 | 9/2003 | Judge |
| 2003/0187942 A1 | 10/2003 | Quine et al. |
| 2003/0196116 A1 | 10/2003 | Troutman |
| 2003/0233418 A1 | 12/2003 | Goldman |

(Continued)

*Primary Examiner* — Ian N Moore
*Assistant Examiner* — Afshawn Towfighi
(74) *Attorney, Agent, or Firm* — Sterne, Kessler, Goldstein & Fox PLLC

(57) ABSTRACT

The present invention provides systems, methods, computer program products, and combinations and subcombinations thereof for filtering received messages. The invention includes a client system having filtering logic, a statistical classifier module, and a classifier database. The classifier module is automatically trained, without manual intervention, when the score generated by the classifier for a received message is inconsistent with a user-defined authoritative status indication. In addition, the classifier module is initialized using user-identified messages in a ratio representative of the ratio of non-spam to spam messages received by the user.

36 Claims, 16 Drawing Sheets

U.S. PATENT DOCUMENTS

| | | |
|---|---|---|
| 2004/0128498 A1 | 7/2004 | Lang et al. |
| 2004/0167968 A1 | 8/2004 | Wilson et al. |
| 2004/0177120 A1 | 9/2004 | Kirsch |
| 2004/0181571 A1 | 9/2004 | Atkinson et al. |
| 2004/0181585 A1 | 9/2004 | Atkinson et al. |
| 2004/0193922 A1 | 9/2004 | Bandini et al. |
| 2004/0205135 A1 | 10/2004 | Hallam-Baker |
| 2004/0236838 A1 | 11/2004 | Tout |
| 2004/0236839 A1 | 11/2004 | Wilson et al. |
| 2004/0242198 A1 | 12/2004 | Oyagi et al. |
| 2004/0250123 A1 | 12/2004 | Robert et al. |
| 2005/0033810 A1* | 2/2005 | Malcolm .................. 709/206 |
| 2005/0039017 A1 | 2/2005 | Delany |
| 2005/0039019 A1 | 2/2005 | Delany |
| 2005/0055410 A1 | 3/2005 | Landsman et al. |
| 2005/0080855 A1 | 4/2005 | Murray |
| 2005/0080856 A1 | 4/2005 | Kirsch |
| 2005/0080857 A1 | 4/2005 | Kirsch et al. |
| 2005/0091264 A1 | 4/2005 | Cameron et al. |
| 2005/0091319 A1 | 4/2005 | Kirsch |
| 2005/0091320 A1 | 4/2005 | Kirsch et al. |
| 2005/0097170 A1 | 5/2005 | Zhu et al. |
| 2005/0097319 A1 | 5/2005 | Zhu et al. |
| 2005/0097321 A1 | 5/2005 | Zhu et al. |
| 2006/0031303 A1* | 2/2006 | Pang .......................... 709/206 |
| 2006/0036693 A1* | 2/2006 | Hulten et al. .............. 709/206 |

* cited by examiner

| | Display Name | Address | Source | Created | Modified | Accessed | Domain Match | Name Match | Signed | Mailing List | Pattern | Reference Count |
|---|---|---|---|---|---|---|---|---|---|---|---|---|
| 210a | Dave Jones | dj@example.com | e-mail | 2/11/2004 | 3/03/2004 | 6/10/2004 | F | F | F | F | F | 233 |
| 210b | Bob Smith | bob@somewhere.com | | | | | T | C | F | F | F | 105 |
| 210c | Somewhere Omnimedia, Inc. | somewhere.com | | | | | T | F | F | F | F | 32 |
| | | | | | | | | | | | | |
| | | | | | | | | | | | | |
| 210n | | bob@* | | | | | F | F | F | F | T | |

FIG. 2

SYSTEM, METHOD, AND COMPUTER PROGRAM PRODUCT FOR FILTERING MESSAGES AND TRAINING A CLASSIFICATION MODULE

CROSS REFERENCE TO RELATED APPLICATIONS

The application claims benefit under 35 U.S.C. §119(e) to U.S. Provisional Application No. 60/616,432, filed Oct. 7, 2004, entitled "System and Method for Filtering Messages," which is incorporated by reference herein in its entirety.

FIELD OF THE INVENTION

The present invention is generally related to electronic mail communications and in particular to a system, method, and computer program product of filtering incoming electronic mail messages.

BACKGROUND OF THE INVENTION

Electronic mail (e-mail) has become an indispensable tool for business and personal communications. Unfortunately, a large percentage of e-mail that is received is unsolicited and unwanted, commonly referred to as spam. In addition, malicious originators hide viruses and other types of malicious software code in e-mail messages attempting to get unsuspecting users to launch or spread the code. Dealing with spam and malicious code wastes users' time and costs money in lost productivity and downtime. Typical systems for handling and filtering spam and malicious software are often difficult to manage and use. In addition, many systems are overly restrictive, blocking too many legitimate message originators, or overly permissive, allowing too many spam messages to pass to a user's inbox.

Some conventional filtering systems use statistical classifiers to determine whether a received message is spam. These statistical classifiers develop a spam score for a received message using information regarding the status of prior received messages. This information is stored in an associated classifier database. To operate effectively, these statistical classifiers systems require a user to initialize the classifier database through a manual bulk training process. In the bulk training process, the user identifies a set of "good messages" (i.e., non-spam/non-malicious) and a set of "bad messages" (i.e., spam/malicious). In addition, these systems recommend that users manually retrain the classifier periodically to adapt to the changing techniques of spammers and/or malicious message originators. Retraining is also in bulk. Without this periodic retraining, the training database is not kept up to date and as a result, the quality of the statistical classifier is reduced.

In addition, in these conventional statistical classifier systems, training is done on every message. As a result, these systems tend to have a large classifier database with a lot of overly redundant information. This unnecessary redundancy negatively impacts the performance of the database and the quality of the scores.

Therefore, what is needed is a system, method, and computer program product that automatically trains the classifier, without manual intervention, when an error in categorizing a message is detected.

BRIEF SUMMARY OF THE INVENTION

Briefly stated, the present invention is directed to systems, methods, computer program products, and combinations and subcombinations thereof for filtering received messages. In an aspect, the present invention is directed to systems, methods, and computer program products for automatically training a classifier, without manual intervention, when the score generated by the classifier is inconsistent with a user-defined authoritative status indication. In a further aspect, the present invention is directed to systems, methods, and computer program products for initializing the classifier using user-identified messages in a ratio representative of the ratio of non-spam to spam messages received by the user.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 2 depicts an exemplary screening list, according to an embodiment of the present invention.

Figure 1:
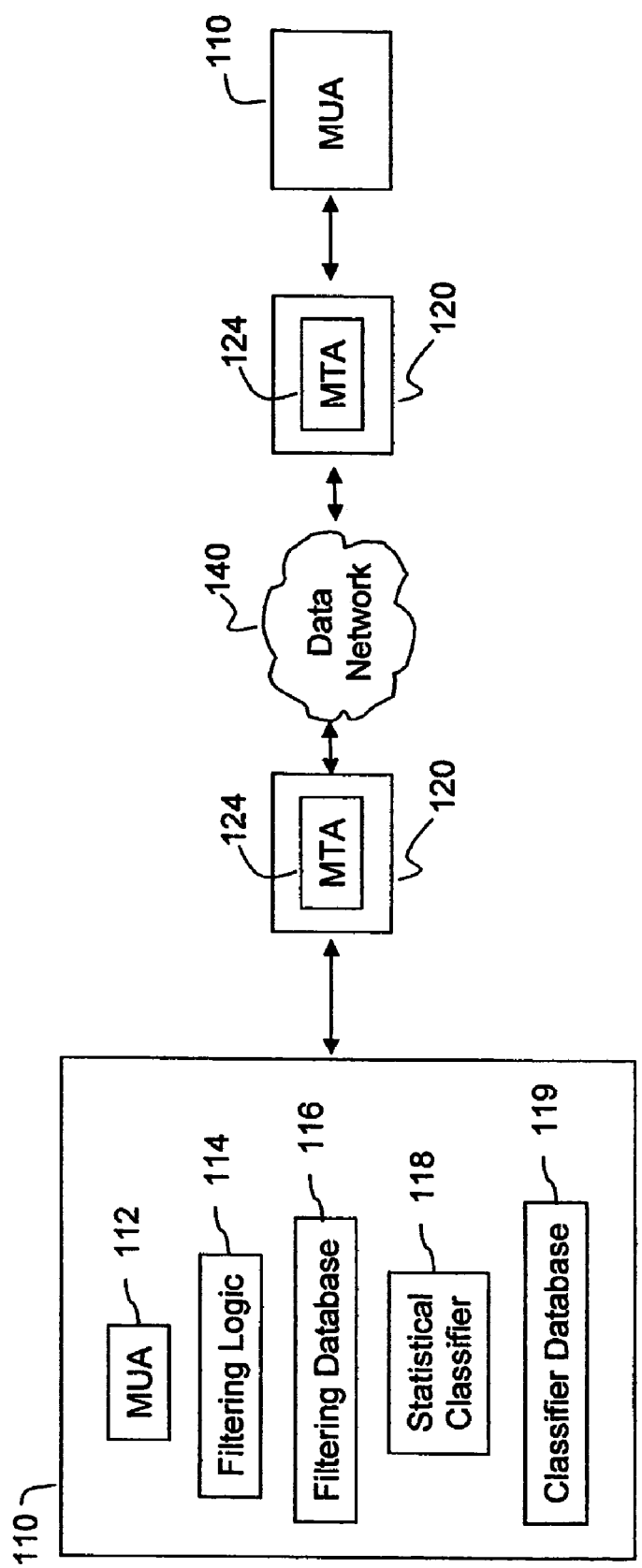
FIG. 1 depicts an exemplary operating environment, according to embodiments of the present invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

1. System Architecture
  1.1 Screening Lists
    1.1.1 Address Field Formats
      1.1.1.1 Ordinary Address
      1.1.1.2 Domain Address
      1.1.1.3 Pattern
    1.1.2 Indicator Fields
      1.1.2.1 Display Name Match
      1.1.2.2 Signed
2. Methods
  2.1 Filtering
    2.1.1 Identification of Message Address
      2.1.1.1 Message Address Type
        2.1.1.1.1 Original Sender Address
        2.1.1.1.2 Re-sender Address
        2.1.1.1.3 Signature Data
      2.1.1.2 Method for Identifying Message Addresses
    2.1.2 Match Processing
    2.1.3 Pass Processing
    2.1.4 Fail Processing
    2.1.5 Quarantine Processing
    2.1.6 Challenge/Response Processing
      2.1.6.1 Challenge/Response Origination Processing
      2.1.6.2 Automatically Responding to Challenges
      2.1.6.3 Authenticated Challenge/Response Processing
      2.1.6.4 Integrating Challenge/Response Processing in an MTA
  2.2 Quarantine Message Processing
    2.2.1 Approve and Block Processing
      2.2.1.1 Simple Approve and Simple Block
      2.2.1.2 Broad Approve and Simple Block
      2.2.1.3 Deep Approve and Deep Block
    2.2.2 Interaction with Signed, Domain, Name Match, and Pattern Match
  2.3 List Management
    2.3.1 Initial Generation of the Screening List
      2.3.1.1 Scan on Install
      2.3.1.2 Manual Scan
      2.3.1.3 Automatic Generation of Negative Screening List Entries
    2.3.2 Monitoring Sent Messages
    2.3.3 Shared Screening Lists
      2.3.3.1 List Synchronization
      2.3.3.2 Friends of Friends Lists
    2.3.4 Visited Web Sites
  2.4 Statistical Classifier Management
    2.4.1 Statistical Classifier Training
      2.4.1.1 Train on Error
      2.4.1.2 Bulk Train
    2.4.2 Classifier Database Management
  2.5 Message Authentication
  2.6 SMTP Received Tagging
3. Conclusion
1. System Architecture FIG. 1 depicts an exemplary operating environment 100 for the system, method, and computer program product for filtering messages, according to embodiments of the present invention. Operating environment 100 includes one or more exemplary client systems 110, one or more exemplary server systems 120, and a data network 140.

Client system 110 includes a mail user agent (MUA) 112, filtering logic 114, and a filtering database 116. MUA 112 (also referred to as a e-mail client) is software logic which allows a user to read, compose, and manage e-mail. Filtering logic 114 is configured to filter e-mail messages received by MUA 112. Filtering database 116 stores screening lists and other data used by filtering logic 114 for filtering and system management.

In an embodiment, client system 110 also includes a statistical classifier 118 and a classifier database 119. The statistical classifier 118 analyzes the content of received messages mathematically and generates a score reflecting the likelihood a received message is spam. A spam score within a first predetermined range indicates a high confidence that the message is good (i.e., not spam/not malicious). A spam score within a second predetermined range indicates a high confidence that the message is bad (i.e., spam/malicious). A spam score within an additional range indicates the status of the message is unknown. Note that the use of the term "spam" is encompass unwanted and/or malicious messages.

In an embodiment, the statistical classifier 118 determines one or more tokens in a received message. A token is a representation of the content of a received message. Tokens can be words, short phrases, or semantics. A semantic is a representation of certain characteristics of the message. For example, a semantic token could represent the percentage of the message in all capitals (e.g., "10% of message in all caps") or represent the size of the message (e.g., "message is really short message" or "message is really long message"). In addition, a semantic token could represent that a message included a uniform resource locator (URL), included an IP address in a URL, included an attachment with a certain filename or file type, or any combination of the above. The statistical classifier 118 also determines the frequency of tokens appearing in non-spam or spam messages.

Classifier database 119 stores information required by the statistical classifier 118 to score incoming messages. In an embodiment, classifier database 119 stores a token table. The token table includes a listing of the unique tokens in the received messages. Each entry in the token table has one or more scores reflecting how many non-spam messages, how many spam messages, and how many unknown messages with which the token is associated. Although filtering database 116 and classifier database 119 are depicted as two separate elements in FIG. 1, a person of skill in the art would recognize that filtering database 116 and classifier database 119 could be combined.

Server system 120 includes a mail transfer agent (MTA) 124. MTA 124 typically delivers and transfers e-mail messages between machines over one or more data networks 140. Data network 140 could be a public network such as the Internet, a private network, or combination of both.

Figure 17:
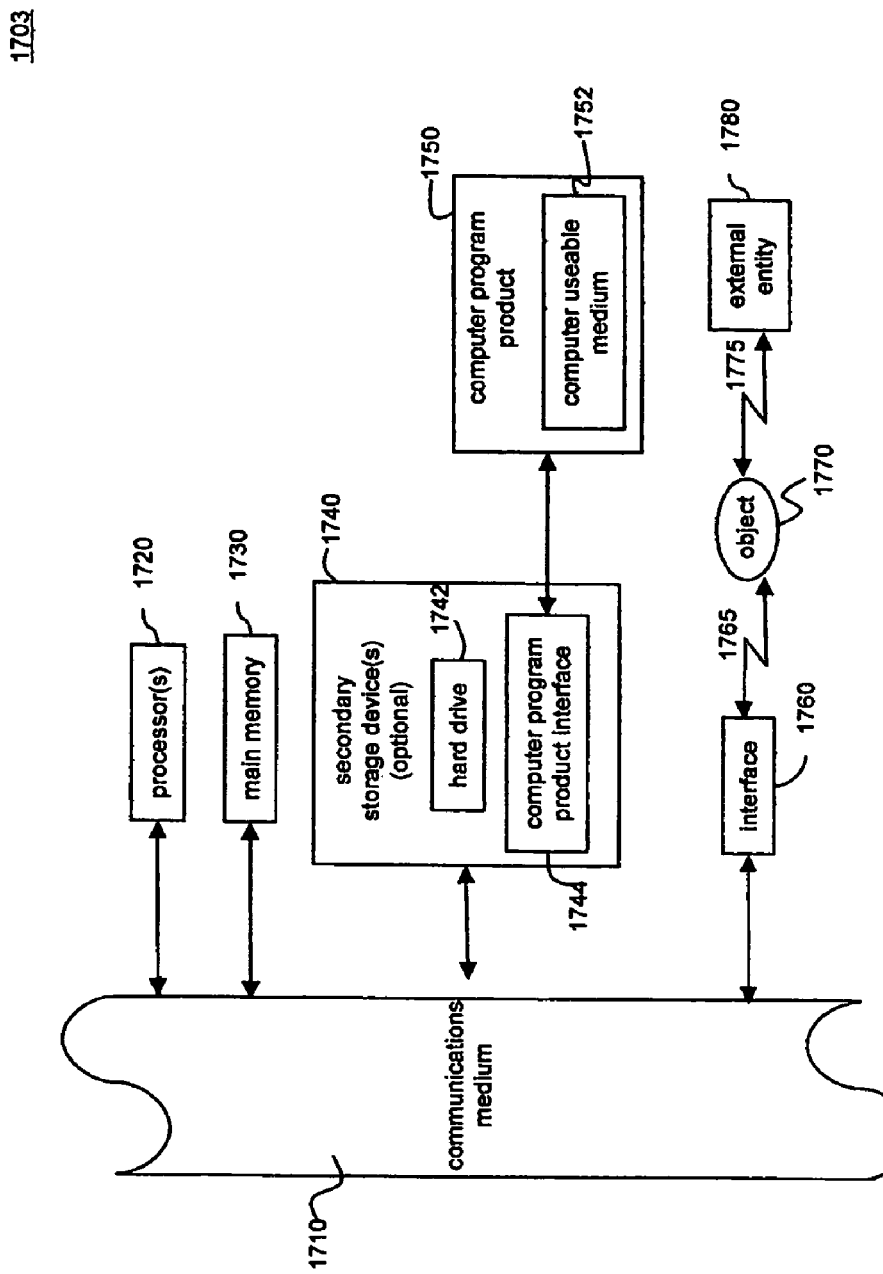
FIG. 17 illustrates a block diagram of a data processing unit that can be used to implement the entities shown in FIG. 1.

FIG. 17 illustrates a block diagram of a data processing unit 1703 that can be used to implement the entities shown in FIG. 1. It is noted that the entities shown in FIG. 1 may be implemented using any number of data processing units 1703, and the configuration actually used is implementation specific.

Data processing unit 1703 may represent a computer, a hand-held computer, a lap top computer, a personal digital assistant, a mobile phone, and/or any other type of data processing device. The type of data processing device used to implement the entities shown in FIG. 1 is implementation specific.

Data processing unit 1703 includes a communications medium 1710 (such as a bus, for example) to which other modules are attached.

Data processing unit 1703 also includes one or more processors 1720 and a main memory 1730. Main memory 1730 may be RAM, ROM, or any other memory type, or combinations thereof.

Data processing unit 1703 may also include secondary storage devices 1740 such as but not limited to hard drives 1742 or computer program product interfaces 1744. Computer program product interfaces 1744 are devices that access objects (such as information and/or software) stored in computer program products 1750. Examples of computer program product interfaces 1744 include, but are not limited to, floppy drives, CD drives, DVD drives, ZIP drives, JAZ drives, optical storage devices, etc. Examples of computer program products 1750 include, but are not limited to, floppy disks, CDs, DVDs, ZIP and JAZ disks, memory sticks, memory cards, or any other medium on which objects may be stored.

The computer program products 1750 include a non-transitory computer useable medium 1752 on which objects may be stored, such as but not limited to optical mediums, magnetic mediums, etc.

Control logic or software may be stored in main memory 1730, second storage device(s) 1740, and/or computer program products 1750.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

The data processing unit 1703 may also include an interface 1760 which may receive objects (such as data, applications, software, images, etc.) from external entities 1780 via any communications media including wired and wireless communications media. In such cases, objects 1770 are transported between external entities 1780 and interface 1760 via signals 1765, 1775. In other words, signals 1765, 1775 include or represent control logic for enabling a processor or computer to perform the functions of the invention. According to embodiments of the invention, such signals 1765, 1775 are also considered to be computer program products, and the invention is directed to such computer program products.

While specific configurations and arrangements are discussed, it should be understood that this is done for illustrative purposes only. A person skilled in the pertinent art will recognize that other configurations and arrangements can be used without departing from the spirit and scope of the present invention. It will be apparent to a person skilled in the pertinent art that this invention can also be employed in a variety of other applications.

1.1 Screening Lists

As described above, the filtering system of the present invention includes a filtering database 116 for storing one or more screening lists. In an embodiment, a master screening list includes positive screening entries and optional negative screening entries. In a second embodiment, a positive screening list and an optional negative screening list are stored. The positive screening entries and/or positive screening list (also referred to as a "whitelist" or "whitelist entries") are used by the system to allow messages received from designated originators. The negative screening list (also referred to as a "blacklist" or "blacklist entries") and/or negative screening list entries, when present, are used by the system to fail or quarantine messages received from designated originators.

For ease of description, except where noted, the following sections use the phrase "screening list" to refer to any embodiment of the screening list (e.g., a master list, 2 separate lists, etc.).

An exemplary screening list 200 is depicted in FIG. 2, according to an embodiment of the present invention. Exemplary screening list includes one or more entries 210*a*-210*n*. Each entry includes an address field 230. The address field is populated with the address used for screening incoming messages against the entry. Examples of address formats that could be stored in address field 230 are described in section 1.1.1. In an embodiment, each entry 210 only includes an address 230. In alternate embodiments, one or more optional fields are included in an entry.

As shown in FIG. 2, an entry 210 may also include an optional reference count 270. The reference count 270 is used to track the approval and/or blocking of the address in the entry during pass, fail, and/or quarantine processing. In an embodiment, the reference count 270 is used to determine the type of screening to apply for the entry. For example, if the reference count 270 has a negative value, the entry is considered a negative screening entry and negative screening is applied for the list entry. If the reference count 270 has a positive value, the entry is considered a positive screening entry and positive screening is applied for the list entry.

In an embodiment, an additional or alternative field is used to indicate a positive or negative screening list entry. For example, this field may have 2 values, a first (e.g., "0" or "T") to indicate a positive entry and a second (e.g., "1" or "F") to indicate a negative entry.

Entry 210 includes an optional display name 220, one or more optional indicator fields 260, an optional source field 240, and one or more optional meta data fields 250. Optional display name 220 stores a display name associated with the entry. Indicator fields 260 are described in more detail in section 1.1.2.

Source field 240 includes an indication of the source of the entry. Example values for source field 240 include e-mail or address book. A value of e-mail indicates that the entry was generated from a received e-mail. A value of address book indicates that the entry was generated from a stored address book.

Each entry may also include one or more meta data fields 250. The meta data fields include additional information associated with the entry. For example, meta data fields may include list management information such as the date the entry was created, modified, and/or last accessed.

In an embodiment, the screening list(s) is periodically updated to remove entries that have not been used or have been used minimally over a defined period of time. For example, a last accessed field can be used to determine whether an entry should remain on the list. Often, entries with negative reference counts outnumber entries with positive reference counts. Therefore, it is desirable to maintain entries with positive counts. Therefore, in an embodiment, only entries with negative reference counts are removed when not used for a period of time.

1.1.1 Address Field Formats 1.1.1.1 Ordinary Address

An ordinary address is a standard e-mail address. Ordinary addresses are the simplest type of entry in a screening list. As shown in FIG. 2, entries 210*a* and 210*b* include an ordinary address in address field 230. The presence of an ordinary address on a positive list or as a positive screening entry, regardless of other meta data associated with the address, indicates that messages from that address are allowed into the user's inbox. Presence of an ordinary address on the negative list or as a negative screening list entry indicates that messages from that address should be either quarantined or discarded.

1.1.1.2 Domain Address

During screening processing, a domain address matches any message from the same domain. Domain addresses are special cases of patterns that occur with sufficient frequency to warrant special treatment in the user interface. For example, in FIG. 2, entry 210c includes a domain address, somewhere.com, in address field 230. During screening processing, entry 210c would match a message having addresses 1 and 2, below, but would not match a message having address 3.

---

1) From: Bob <bob@somewhere.com>
2) From: Bob <bob@sub.somewhere.com>
3) From: Bob <bob@other.com>

---

1.1.1.3 Pattern

A pattern format for an address allows multiple addresses to be covered by a single entry. In an embodiment, pattern entries can be of two forms, wildcard expressions and/or regular expressions. Examples of wildcard patterns include:

---

| | |
|---|---|
| bob@* | matches all bob's around the world |
| bob@*.fr | matches all bob's from France |
| bob-?@bob.com | matches bob-1@bob.com, bob-Z@bob.com, etc |
| *.?? | matches everyone with a two letter top level domain |

---

Although the above examples illustrate use of the '*' and '?' wildcards, persons of ordinary skill in the art will recognize that a number of different wildcard languages can be used in a pattern entry.

Several popular regular expression languages can also be used to form a pattern in an entry. For example, Perl compatible regular expressions can be used in pattern match entries. The following are examples of Perl pattern expressions:

---

| | |
|---|---|
| /bob@.*/ | matches all of the bob's (equivalent to bob@* wildcard) |
| /\d{7}/ | matches any address with 7 consecutive digits |

---

The last regular expression is useful for handling messages from systems that send a voicemail message in an e-mail message and use the calling party's phone number as the sending address.

1.1.2 Indicator Fields

Indicator fields are used to provide additional processing instructions and/or additional information regarding fields included in the entry. Each entry may include one or more indicator fields 260. In an embodiment, one or more of the indicator fields are Boolean fields. As would be appreciated by persons of skill in the art, other formats for the indicator fields could be used with the present invention.

1.1.2.1 Display Name Match

Each screening list entry includes an optional display name match field 262. When present, the field indicates whether name match processing is applied for the list entry during screening processing. If the field indicates name match processing is to be applied (e.g., the name match field has a value of "true"), the entry also includes a name in the display name field 220. When name match processing is indicated, during screening processing, the display name associated with the message address is matched against the display name 220 in the list entry.

For example, in FIG. 2, entry 210b includes a display name field having a value of "Bob Smith" and a name match value of "true." During screening processing, entry 210b would match a message with address 1 but would not match a message with address 2.

---

1) From: Bob Smith <bob@somewhere.com>
2) From: Super Bargains <bob@somewhere.com>

---

Note that if the name match field of the entry had a "false" value, display name match processing would not be applied and both addresses 1 and 2 would match the entry 210b.

A user may choose to add a name match field to an entry to provide a small measure of protection from the most common kind of address forgery used in spam or other types of malicious messages. As screening lists have become more common, spammers or other malicious message originators have attempted to circumvent them by setting the From (or Return-Path, or both) to the same address as the recipient of the message. Currently, spammers and other malicious message originators typically cannot correctly guess the recipient's display name. Therefore, the system automatically adds the e-mail address of the user to the screening list with an associated display name and sets the name match indicator to "true." This allows a user to send e-mail messages to himself while blocking almost all incoming messages forged with his address as the sender. If an originator somehow obtains or correctly guesses the user's display name, a user can simply change the display name (e.g., by adding or removing a middle initial) to avoid unwanted messages.

In an embodiment, an entry that does not include a display name match field 262 or indicates display name match processing is not to be applied may also include a display name in display name field 220. The use of a display name associated with an entry also aids the user in remembering to whom the address refers.

1.1.2.2 Signed

A screening list entry includes an optional signed indicator field 263. When present, this field indicates whether signature match processing is applied for the entry. If the field indicates that signature match processing is to be applied, the entry also includes a signature in address field 230, or in an additional field associated with the entry. When signature match processing is indicated, during screening processing, the signature associated with the message address is matched against the signature stored in the screening list entry.

Digital signatures offer the best protection against forged addresses. For example, a spammer or other malicious message originator would need to know the legitimate sender's private key to correctly forge an address. If an list entry is a signed address entry, any received message originating from the address must include some form of digital signature.

In an embodiment, stored digital signatures are formatted according to S/MIME or PGP format. S/MIME and PGP are common forms of digital signatures. Both standards use public/private key algorithms. That is, they associate a public key with an e-mail address. The public key can be used to verify that a message was signed by the corresponding private key associated with the address.

Because many mail user agents (MUAs) have undesirable user interfaces for handling S/MIME and PGP, in an embodiment, S/MIME and PGP messages are transformed to an equivalent form by including the signing information in X-mail headers. In this embodiment, the format in which the data is encoded is transparent to existing user agents and users.

As would be appreciated by persons of skill in the art, other forms of signature or user authentication can be used with the present invention.

2. Methods 2.1 Filtering

Figure 3:
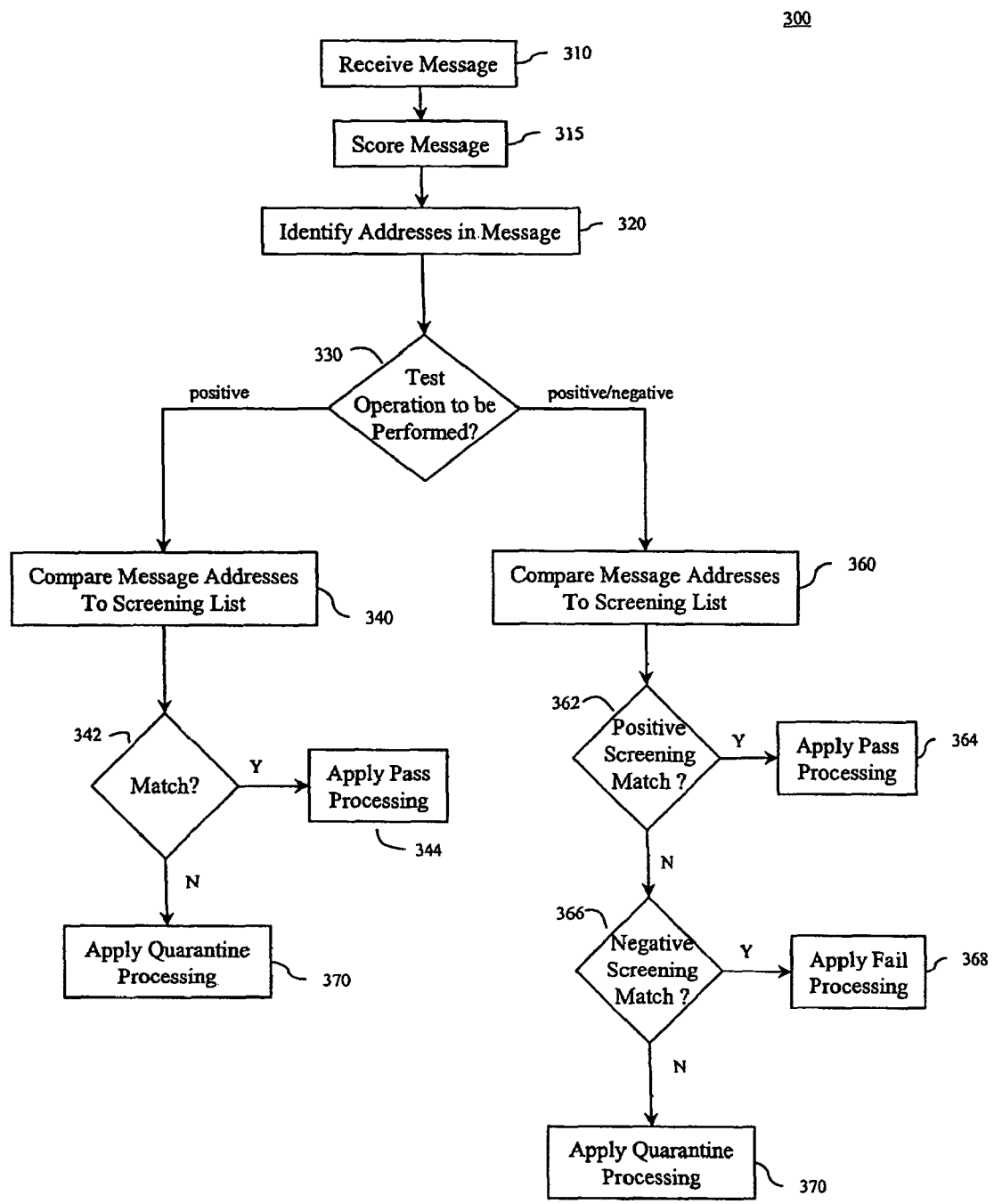
FIG. 3 depicts a flowchart of an exemplary method for filtering messages, according to an embodiment of the present invention.

FIG. 3 depicts a flowchart 300 of a method for filtering received messages. The flowchart 300 will be described with continued reference to the example system architecture 100 described in reference to FIG. 1 and the exemplary screening list described in reference to FIG. 2, above. However, the invention is not limited to those embodiments. Note that some steps shown in flowchart 300 do not necessarily have to occur in the order shown.

In step 310, a message is received.

In step 315, the received message is scored by statistical classifier 118. This step is optional. The score represents the likelihood that the message is spam based on the content and/or characteristics of the message. In an embodiment, scores range from 0 to 100. A score at the top of the range (e.g., 95-100) indicates a high confidence that the message is spam. A score at the bottom of the range (e.g., 0-5) indicates a high confidence that the message is not spam. A score in the middle of the range (e.g., 14-52) indicates the status of the message is unknown. As would be appreciated by persons of skill in the art, other methods for representing a spam score can be used with the present invention.

Figure 4:
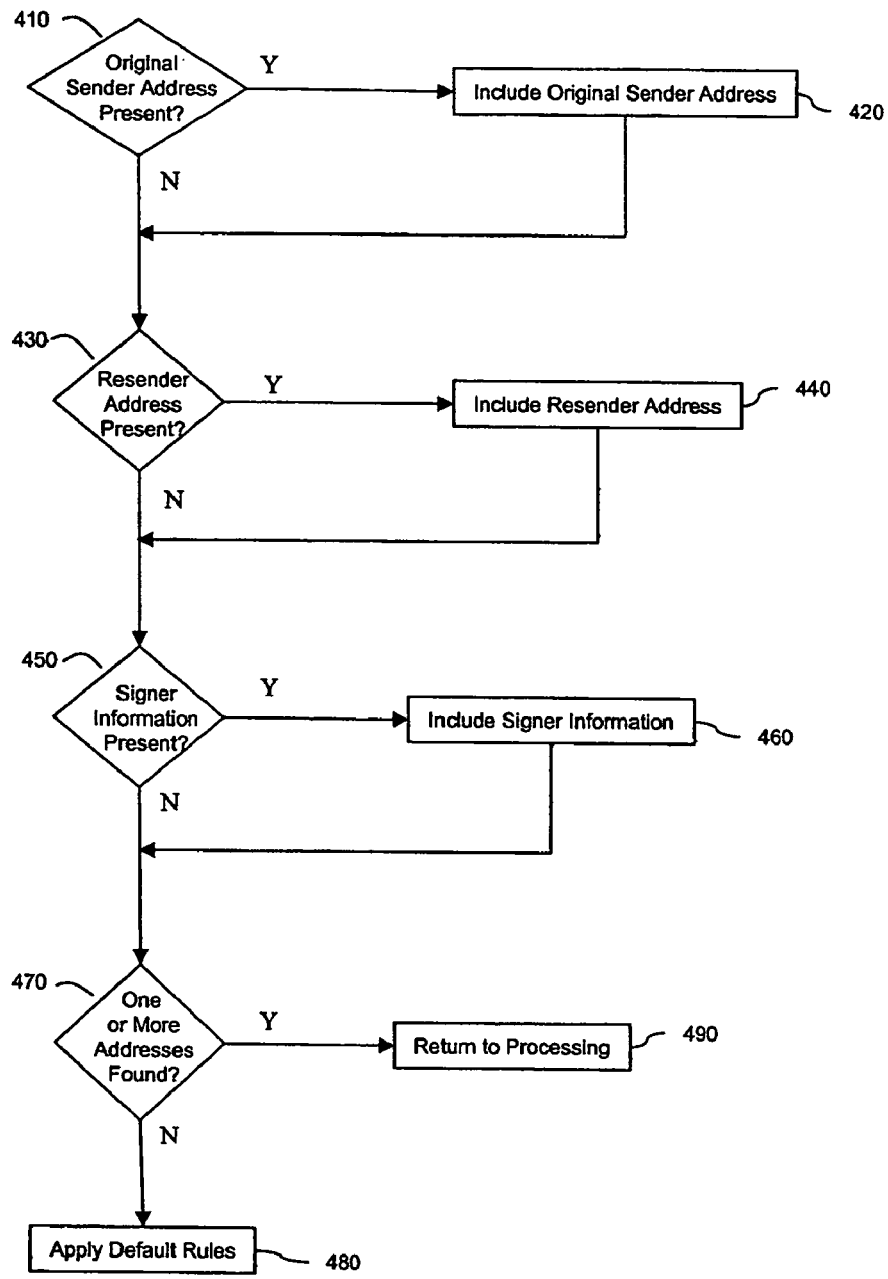
FIG. 4 depicts a flowchart of an exemplary method for identifying sender addresses in a received message, according to an embodiment of the present invention.

In step 320, addresses associated with the received message are identified. Each message can have any number of sender addresses (including zero) associated with it. For example, a message may have from 0 to 3 associated sender addresses. FIG. 4, discussed in Section 2.1.1 below, depicts an example method for identifying one or more sender addresses associated with a message. For ease of description only, the message addresses are referred to collectively as a message address list.

In step 330, a determination of the type of screening operation to be performed is made. This step is optional. In an embodiment supporting only a single type of screening, step 330 would not be included. If positive screening is to be performed, operation proceeds to step 340. If positive and negative screening is to be performed, operation proceeds to step 360.

In step 340, each message address identified in step 320 is compared to screening list entries.

In step 342, a determination is made whether the message address matched a screening list entry. Match processing is described in more detail in section 2.1.2. If it is determined that the message address matches a screening list entry, operation proceeds to step 344. If it is determined that the message address does not match a screening list entry, operation proceeds to step 370.

In step 344, pass processing is applied to the message address. Pass processing is described in more detail below in Section 2.1.3.

Steps 342 and 344 are repeated for each message address identified in step 320.

In step 360, each message address identified in step 320 is compared to entries in the screening list. In an embodiment, a master screening list includes positive screening list entries and negative screening list entries. In this embodiment, each message address is compared to criteria included in each screening list entry. In an alternate embodiment, each message address is compared to a positive screening list and a separate negative screening list.

In step 362, a determination is made whether the message address matched a positive screening list entry or an entry in a positive screening list. For example, the value of the reference count 270 or other field is examined. If the reference count has a value of 1 or greater or if field indicates a positive screening entry, then a positive match has occurred. If a match has occurred, operation proceeds to step 364. If a match has not occurred, operation proceeds to step 366.

In step 366, a determination is made whether the message address matched a negative screening list entry or an entry in a negative screening list. For example, the value of the reference count 270 or other field is examined. If the reference count has a value of −3 or less or if field indicates a negative screening entry, then a negative match has occurred. If a match has occurred, operation proceeds to step 368. If a match has not occurred, operation proceeds to step 370. Note that in an embodiment, if the reference count has a value −2, −1 or 0, the status of the message is unknown and operation proceeds to step 370. As would be appreciated by persons of skill in the art, other values for the reference count to indicate positive, negative, or quarantine could be used, as required by the user and/or application.

In an embodiment, an additional step is performed prior to step 370. When a user sends a message to address A and the recipient replies from address B, the method described above may quarantine the message if address B is not on the screening list. To address this situation, a list of subject lines and message identifiers is stored for sent mail. In this step, the message identifier and/or subject line in the reply is matched against the list of stored subject lines and message identifiers. If a match is found, pass processing is performed (e.g., message approved and address B added to screening list). If no match is found, operation proceeds to step 370. In this method, an optional time interval may be used to determine whether the match occurred. For example, if the reply does not arrive within a predefined time period (e.g., 7 days) after the original message was sent, a match is not attempted.

Steps 362 and 366 are repeated for each message address identified in step 320.

Although FIG. 3 depicts steps 362 occurring prior to step 366, persons of skill in the art will recognize that these steps can be performed in any order or concurrently.

In step 364, pass processing is applied to the message address. Pass processing is described in more detail below in Section 2.1.3.

In step 368, fail processing is applied to the message address. Fail processing is described in more detail below in Section 2.1.4.

In step 370, quarantine processing is applied to the message address. Quarantine processing is described in more detail below in Section 2.1.5.

2.1.1 Identification of Message Addresses

When determining sender addresses associated with a message, the system considers a plurality of different types of senders. For example, a message may have an original sender address, a resender address, and/or a signer. Different parts of the message record these different types of sender addresses. Examples of the types of sender addresses that can be used are described in Section 2.1.1.1.

2.1.1.1 Message Address Types 2.1.1.1.1 Original Sender Address

One type of message address is an original sender address. The original sender of an e-mail message is the person or entity that created and first sent the message. An original sender may be a person using a Mail User Agent (MUA) such as Outlook or Outlook Express. An original sender may also be a software program that sends a message in response to some event. For example, the automated message may be a stock price alert sent to a brokerage customer, a political newsletter sent to supporters, a notification of a computer failure sent to a system administrator, or a mass distribution sent to millions of people advertising a sale at a store.

The original sender address is commonly included in the From header of a message. This is the address that is typically displayed by MUAs. Because the From address is visible to the recipient, the address usually contains a human friendly version of the sender's name along with a human legible e-mail address.

The original sender address is also commonly included as the envelope sender in the SMTP protocol. The SMTP envelope sender is the address to which delivery failures and/or error reports.

For message sent by individuals, it is generally desirable to use the individual's e-mail address as the envelope sender. This way, if there are any problems delivering the message, the person will receive some notification of those problems. For messages sent by software programs, it is often desirable to encode in the address used as the envelope sender some additional information to aid in automated processing of delivery failures. This information may be the e-mail address of the intended recipient, the date and time a message was sent, or some sort of unique message identifier. Since the envelope sender is not often seen by the user, this address can be quite contorted and decidedly unfriendly to human readers.

Most MTAs (e.g., mail servers) record the SMTP envelope sender in a Return-Path header in the message so that MUAs will be able to access this information. Because RFC 2822 headers are easier to read than SMTP traces, the examples below show the envelope sender in Return-Path headers.

Example 1 is a partial message header for a message from one individual to another. In this example, the From and Return-Path addresses are the same. Therefore, the only possible address to include as the original sender address is bob@somewhere.com.

Example 1

| | |
|---|---|
| Return-Path: | bob@somewhere.com |
| From: | Bob Smith <bob@somewhere.com> |
| To: | Alice Smith <alice@somewhere.com> |
| Subject: | Hey there . . . |

In example 2, below, the message is from a hypothetical online stock broker entity, superbroker, to an individual named Bob. In this example, the original sender could be represented by either the relatively simple From address (alerts@superbroker.com) or the more complicated address in the Return-Path header. While the complicated Return-Path header is useful for tracking mail delivery problems, a typical user may not understand the address. Furthermore, a complicated Return-Path address is likely to change with every message, limiting its usefulness in filtering for malicious messages. Therefore, in this case, alerts@superbroker.com is selected as the original sender address.

Example 2

| | |
|---|---|
| Return-Path: | bob=somewhere.com-932568346@bounces.superbroker.com |
| From: | Online Broker <alerts@superbroker.com> |
| To: | Bob Trader <bob@somewhere.com> |
| Subject: | AVGO off 20% at opening bell |

Example 3, below, is indicative of the scenario where an individual sends the same message to a large number of recipients (e.g., an individual running for a political office). In example 3, the From address (bob@bob04.org) and the Return-Path address (postmaster@bob04.org) are different. However, unlike example 2, both addresses are reasonable choices to represent the original sender. Both addresses are likely to be the same on every message received so adding either the From address or the Return-Path address to the positive screening list or negative screening list would meet the screening needs of a user. However, the address on the From line is the better choice for the original sender. Because the message is sent to a large number of recipients, the individual originating the message (bob) does not want or need to receive administrative message (e.g., bounced messages, etc.). Therefore, the envelope sender address has been set to postmaster@bob04.org. Unlike example 2, the individual originating this message probably does not have software to automatically track bounced mail but instead has another individual looking at all mail sent to postmaster@bob04.org. Normal replies are still delivered to bob@bob04.org.

Example 3

| | |
|---|---|
| Return-Path: | postmaster@bob04.org |
| From: | Bob For President <bob@bob04.org> |
| To: | Loyal Supporters <supporters@bob04.org> |
| Subject: | Get out and vote! |

Example 4, below, is an example of a partial header for a message from an automated process that alerts an individual whenever an event occurs (e.g., whenever the web server he administers goes down). Because there is no From line, the Return-Path address is the only possible choice for the original sender.

Example 4

| | |
|---|---|
| Return-Path: | root@fromitz.com |
| To: | bob@fromitz.com |
| Subject: | the web server has fallen and can't get up |

Example 5, below, is an example of a partial header for a spam message. As can be seen in Example 5, the original sender appears to be bob@somewhere.com, but that information is likely forged. Example 5 illustrates that it would be beneficial to also consider the display name in addition to the e-mail address when performing screening. While Bob's e-mail address may be bob@somewhere.com, he likely does not have his display name set to Super Bargains.

Example 5

| | |
|---|---|
| Return-Path: | bob@somewhere.com |
| From: | Super Bargains <bob@somewhere.com> |
| To: | bob@somewhere.com |
| Subject: | Wh1te 5ale @ Penney's      kshgdk |

As discussed above, a user can optionally require that the identity of a sender listed on the positive or negative screening include the display name as well as the e-mail address. This can prevent obvious forgeries, such as shown in Example 5. The SMTP envelope sender does not include a display name so the Return-Path header should never contain a display name. That fact, combined with the illegibility of many Return-Path headers, is why method 400, described below, prefers the value of the From header as the original sender of a message.

2.1.1.1.2 Re-sender Address

Another type of sender address is a resender address. A single message may include any number of resender addresses, including zero. Most often the resender of a message will be a Mailing List Manager (MLM) but it can also be a person or device sending mail on behalf of another person. In these cases, the identity of the original sender is usually, but not always, preserved in the From header and the envelope sender is usually, but not always, set to be an address controlled by the resender. This allows replies to go to the original sender but directs administrative messages (e.g., bounce messages) to the resender. Many resenders also add additional headers to the message to identify the resender. IETF RFC 2369 and RFC 2919 describe the standard headers for including resender address information. The RFC standard headers include the following:

List-Post
List-Owner
List-Id
List-Unsubscribe
List-Subscribe
List-Help
List-Archive The following common non-standard headers also can be used to include resender information.

Mailing-List
X-Mailing-List
Sender
Errors-To
X-Loop

The resender address may also be included in other non-standard headers. Depending on the specific header used, the header may include one or more Uniform Resource Identifiers (URIs), e-mail addresses, or other type of identifier.

2.1.1.1.3 Signature Data

A message may also include signature data associated with a message. Thus, the message screening list may include any number of signature data entries, including zero. In an embodiment, the signature data includes one or more digital signatures. For example, a message may have been signed by multiple entities and/or different components of the message may have been signed by different entities.

As would be appreciated by persons of skill in the art, any form of digital signature (e.g., S/MIME, PGP, etc) or other message authentication techniques can be used with the present invention.

2.1.1.2 Method for Identifying Message Addresses

FIG. 4 depicts a method 400 for identifying addresses in a received message. In step 410, a determination is made whether the message includes an original sender address. If the message includes an original sender address, operation proceeds to step 420. If the message does not include an original sender address, operation proceeds to step 430.

In step 420, the original sender address is included in the sender address list. When selecting the original sender address to include in the sender address list, the system applies an original sender address selection algorithm. In an embodiment, the system includes the From address as the original sender address. Operation then proceeds to step 430.

In step 430, a determination is made whether the message includes a resender address. If the message includes a resender address, operation proceeds to step 440. If the message does not include a resender address, operation proceeds to step 450.

In step 440, at least one resender address is included in the message. Any number of resender addresses can be included in the sender address list. In an embodiment, the system includes one resender address. When selecting the one or more resender addresses to include in the sender address list, the system applies a resender address selection algorithm. The selection algorithm determines the number of resender addresses to include in the sender address list and the method for determining the senders to include. Operation then proceeds to step 450.

In an embodiment, when a message includes list headers, a single re-sender address is selected according to a predefined priority. For example, the resender address is selected according to the following priority: List-Post, Mailing-List, List-Owner, List-Id, List-Unsubscribe, List-Subscribe, List-Help, List-Archive, Sender, and Errors-To. If the header contains multiple addresses, the first mailto: address is selected as the re-sender address.

Example 6, below, is an example of a header from a typical standards compliant mailing list message. In example 6, the original sender is <bob@somewhere.com>. However, the message has clearly been resent. Given the priority rules described in the above example, the List-Post address would be used as the resender address.

Example 6

| | |
|---|---|
| Return-Path: | <owner-flossing@pets.com> |
| From: | Bob Smith <bob@somewhere.com> |
| To: | Pet Flossing Discussion <flossing@pets.org> |
| Subject: | Should I use mint or chicken flavored floss? |
| Sender: | owner-flossing@pets.com |
| List-Id: | <owner-flossing.pets.com> |
| List-Help: | <http://docs.pets.com/help/> (Web Help), |
| | <mailto:majordomo@pets.com?subject=help> (Mail Help) |
| List-Archive: | <http://docs.pet.com/mail/> (Web Archive) |
| List-Post: | <mailto:flossing@pets.com> |

In another example, when a person is sending a message on behalf of another person, most software programs use the sender header to indicate the identity of the resender. As would be appreciated by persons of skill in the art, other types of resender selection processing can be used.

In step 450, a determination is made whether the message includes signature data. If signature data is present, operation proceeds to step 460. If signature data is not present, operation proceeds to step 470.

In step 460, signature data is included in the message. Any number of signature data entries can be included in the sender address list. In the case of digital signatures, in the majority of messages the original sender is the only signer and signs the entire body of the message. In an embodiment, the system includes one signer address.

When selecting the one or more signature data entries to include in the sender address list, the system applies a selection algorithm. For example, the system includes the first, outer-most signer of the message in the sender address list. As would be appreciated by persons of skill in the art, other types of signature data selection processing can be used.

In step 470, a determination is made whether one or more addresses were identified. If one or more addresses were identified, operation proceeds to step 490 and identification processing ends. If no addresses were identified, operation proceeds to step 480.

In step 480, default processing is applied. In an embodiment, a list of subject lines on messages sent by a user are stored. During default processing, the subject line of the message is compared with the subject line list. If a match is found, pass processing is applied. In an embodiment, if no data is entered in the subject line, quarantine processing is applied. As would be appreciated by persons skilled in the art, other types of default processing could be applied.

Although FIG. 4 describes an order to determining original sender address, resender address, and signer information, persons of ordinary skill in the art will appreciate that these processing steps can occur in any order or in parallel.

2.1.2 Match Processing

Figure 5:
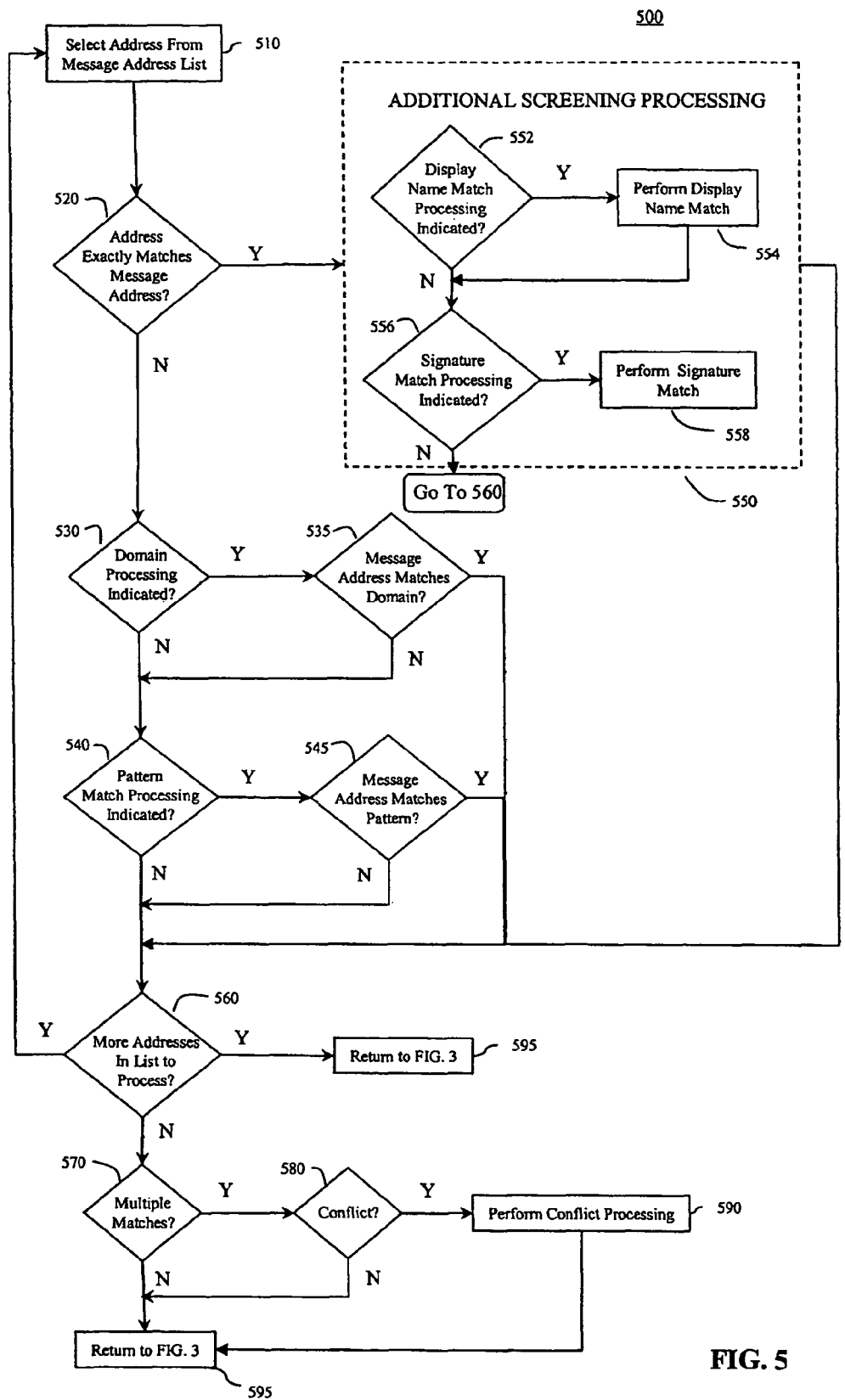
FIG. 5 depicts an exemplary method for match processing, according to an embodiment of the present invention.

FIG. 5 depicts a flowchart 500 of an exemplary method 500 for match processing, according to an embodiment of the present invention. Method 500 begins at step 510 when one address from the message address list identified in step 320 of FIG. 3 is selected. Note that some steps shown in flowchart 500 do not necessarily have to occur in the order shown.

In step 520, a determination is made whether an address in a screening list entry exactly matches the message address. If a screening list address exactly matches the message address, operation proceeds to step 550. If no exact match occurs, operation proceeds to step 530.

In step 530, a determination is made whether domain match processing is indicated for an entry. In an embodiment, domain match processing is indicated in the domain match indicator field (e.g., field has a value "true"). Additionally or alternatively, domain match processing is indicated by the format of the address. If domain match processing is indicated, operation proceeds to step 535. If domain match processing is not indicated, operation proceeds to step 540.

In step 535, a determination is made whether the message address matches the domain address. If a match is found, operation proceeds to step 560. If no match is found, operation proceeds to step 540.

In step 540, a determination is made whether pattern match processing is indicated for an entry. In an embodiment, pattern match processing is indicated in the pattern match indicator field (e.g., field has a value "true"). Additionally or alternatively, pattern match processing is indicated by the format of the address. If pattern match processing is indicated, operation proceeds to step 545. If pattern match processing is not indicated, operation proceeds to step 560.

In step 545, a determination is made whether the message address matches the pattern address. If a match is found, operation proceeds to step 560. If no match is found, operation also proceeds to step 560.

In step 550, additional screening processing is performed. Step 550 is optional. Additional entry processing includes display name match processing and/or signature match processing. Other types of additional screening processing can be included in step 550, as required.

In step 552, a determination is made whether the screening list entry requires a display name match. In an embodiment, display name processing is indicated in the display name match indicator field (e.g., field has a value "true"). Additionally or alternatively, display name match processing is indicated by presence of a display name in the entry. If the screening list entry requires a display name match, operation proceeds to step 554. If the screening list entry does not require a display name match, operation proceeds to step 556.

In step 554, display name match processing is performed. Operation proceeds to step 556.

In step 556, a determination is made whether the screening list entry requires a signature match. In an embodiment, signature processing is indicated in the signed indicator field (e.g., field has a value "true"). Additionally or alternatively, signature processing is indicated by the presence of a signature in the entry. If the screening list entry requires a signature match, operation proceeds to step 558. If the screening list entry does not require a signature match, operation proceeds to step 560.

In step 558, signature match processing is performed.

Although FIG. 5 describes an order for additional processing, persons of ordinary skill in the art will appreciate that these processing steps can occur in any order or in parallel.

Note that one or more of steps 520, 530, and 540 may be repeated until a match is attempted against each entry on the screening list.

In step 560, a determination is made whether additional message addresses remain to be processed. If additional addresses remain to be processed, operation returns to step 510. If no additional addresses remain to be processed, operation proceeds to step 570.

In step 570, a determination is made whether more than one matching screening list entry was found. For example, one entry matches a first message address and a second entry matches a second message address. If more that one matching entry is found, operation proceeds to step 580. If zero or one matching entries is found, operation proceeds to step 595 where screening processing according to FIG. 3 continues.

In step 580, a determination is made whether a conflict exists between the matched entries. For example, if one entry is a positive screening entry and another entry is a negative entry. If no conflicts are encountered, operation proceeds to step 595 where screening processing according to FIG. 3 continues. If a conflict is encountered, operation proceeds to step 590.

In step 590, conflict processing is performed. Operation then proceeds to step 595.

2.1.3 Pass Processing

Figure 6:
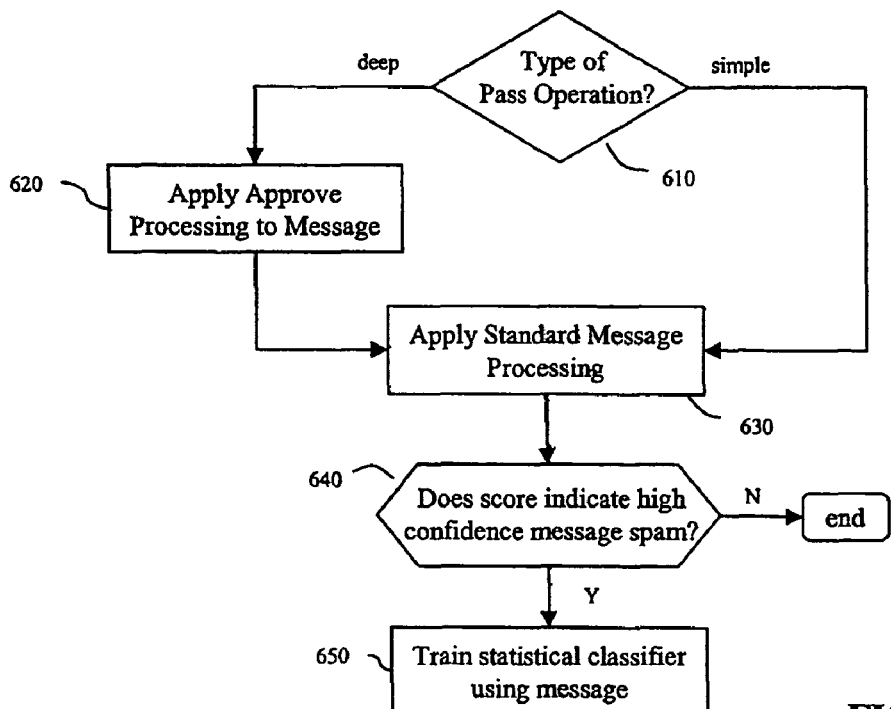
FIGS. 6 and 7 depict flowcharts of exemplary methods for pass and fail processing, according to embodiments of the present invention.

FIG. 6 depicts a flowchart 600 of a method for pass processing, according to embodiments of the present invention. Method 600 begins at step 610 when a determination is made of which type of pass processing operation is to be applied. This step is optional. In an embodiment supporting only a single type of pass processing, step 610 would not be included. In an embodiment, the type of pass processing operation to be applied is configurable. If simple pass processing is to be applied, operation proceeds to step 630. If deep pass processing is to be applied, operation proceeds to step 620.

In step 620, Approve processing is applied to the message. Approve processing is described in more detail in section 2.2.1. Step 620 may result in additional modification to the screening list and additional retests of the quarantine folder, as described in section 2.2.1. For example, pass, test, and approve may call each other recursively until the transitive closure of the Approve operation is complete.

In step 630, standard message processing is applied to the message. For example, Pass processing allows the message to move to the user's inbox or remain in the folder where it currently resides if the user explicitly requested screening processing on a message in a folder. Standard message processing allows the typical new mail notification to occur.

In an embodiment, additional steps are performed during flowchart 600 to train statistical classifier 118. These steps are optional. Training of statistical classifier is described in more detail in Section 2.4.1. As described above, pass processing is performed when an address (or addresses) associated with a message is found on the positive screening list. The presence of an address on the positive screening list provides an authoritative indication of the status of the message (e.g., message is a non-spam/non-malicious message). Steps 640 and 650 are performed to determine whether the score generated by statistical classifier 118 was consistent with the authoritative status indication or whether the generated score was erroneous (i.e., inconsistent).

In step 640, a determination is made whether the generated score indicated a high confidence that the message was spam. If the generated score did not indicate a high confidence that the message was spam, the score is consistent with the authoritative status indication and pass processing ends. If the generated score indicates a high confidence that the message was spam, the score is inconsistent with the authoritative status indication and considered erroneous. Operation then proceeds to step 650.

In step 650, the received message is marked as a non-spam message and used to train statistical classifier 118. In this manner, statistical classifier 118 is not trained using every received message. Instead, statistical classifier 118 is only trained when an error or discrepancy is found between the authoritative status indication and the spam score.

As would be appreciated by persons of skill in the art, step 640 could determine whether the score indicated a high confidence that the message was not spam.

2.1.4 Fail Processing

Figure 7:
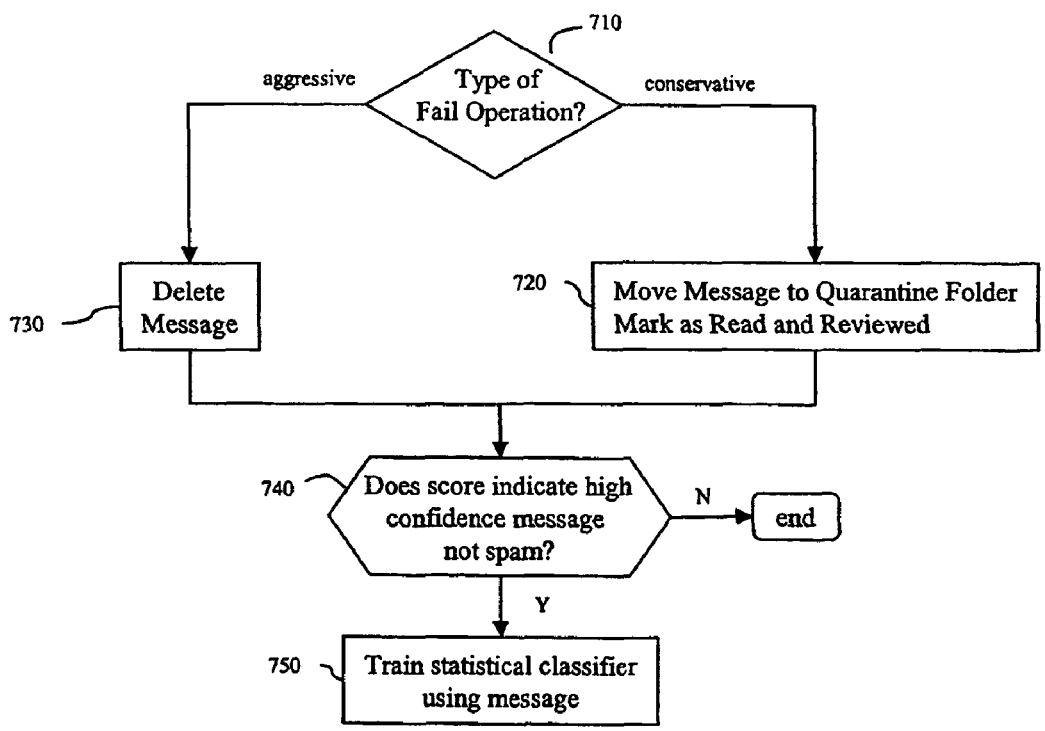

FIG. 7 depicts a flowchart 700 of a method for fail processing, according to embodiments of the present invention. Method 700 begins at step 710 when a determination is made which type of fail processing operation is to be applied. This step is optional. In an embodiment supporting only a single type of fail processing, step 710 would not be included. In an embodiment, the type of fail processing operation to be applied is configurable. If conservative fail processing is to be applied, operation proceeds to step 720. If aggressive fail processing is to be applied, operation proceeds to step 730.

In step 720, during conservative fail processing operation, the message is moved to the quarantine folder and marked as read and reviewed. This action prevents the message from appearing on a list of unreviewed messages.

Marking a message as read or unread is directly reflected in the user interface of most MUAs. For example, folders that contain unread messages show the number of unread messages in blue next to the folder name. Also, unread messages in the message list are shown in bold while messages that are not read are shown in normal typeface.

Marking a message as reviewed or unreviewed is used to simplify the review of quarantined messages for a user. Unreviewed messages are displayed to the user during a quarantine dialog. Reviewed messages are not displayed to the user during a quarantine dialog. However, both unreviewed and reviewed messages remain in the quarantine folder until subsequent action is taken.

In step 730, during aggressive fail processing operation, the message is deleted. The delete operation is different than moving a message to the deleted or trash folder of the MUA. The delete operation destroys the message.

In an embodiment, both conservative and aggressive fail processing suppress the new mail notification that typically accompanies the arrival of new messages.

In an embodiment, additional steps are performed during flowchart 700 to train statistical classifier 118. These steps are optional. Training of statistical classifier 118 is described in more detail in Section 2.4.1. As described above, fail processing is performed when an address (or addresses) associated with a message is found on the negative screening list. The presence of an address on the negative screening list provides an authoritative indication of the status of the message (e.g., message is a spam message). Steps 740 and 750 are performed to determine whether the score generated by statistical classifier 118 in step 315 was consistent with the authoritative status indication or whether the generated score was erroneous (i.e., inconsistent).

In step 740, a determination is made whether the generated score indicated a high confidence that the message was not spam. If the generated score indicates a high confidence that the message was spam, the score is consistent with the authoritative status indication and fail processing ends. If the generated score indicates a high confidence that the message was not spam, the score is inconsistent with the authoritative status indication and considered erroneous. Operation then proceeds to step 750.

In step 750, the received message is marked as a spam message and used to train statistical classifier 118. In this manner, statistical classifier 118 is not trained using every received message. Instead, statistical classifier 118 is only trained when an error or discrepancy is found between the authoritative status indication and the spam score.

As would be appreciated by persons of skill in the art, step 740 could determine whether the score indicated a high confidence that the message was spam.

2.1.5 Quarantine Processing

Quarantine processing moves the message to the quarantine folder and marks the message as unreviewed. As described above, by marking the message as unreviewed, the message will be displayed in the quarantine dialog box. In an embodiment, the message is marked as read so that it is less obtrusive to a user. In an embodiment, quarantine processing suppresses new mail notification.

In an embodiment, after a message is moved to the quarantine folder, challenge/response processing is performed. Challenge/response processing is described in more detail in section 2.1.6.

2.1.6 Challenge/Response Processing

To augment the manual maintenance of the screening list using approve and block processing described in section 2.2, optional challenge/response processing can be used to authenticate senders. Typically, challenge/response systems require the message sender to take an action which is easy for a legitimate sender to take but is impractical or uneconomic for spammers or other malicious originators to take. The simplest form of a challenge is one that asks the sender to reply to the challenge to confirm that the return address on the original message was valid. The reply can be initiated manually or automatically by a computer program. This simple reply style challenge/response is used by mailing list managers to confirm the validity of new subscribers to the list.

2.1.6.1 Challenge/Response Origination Processing

Figure 8:
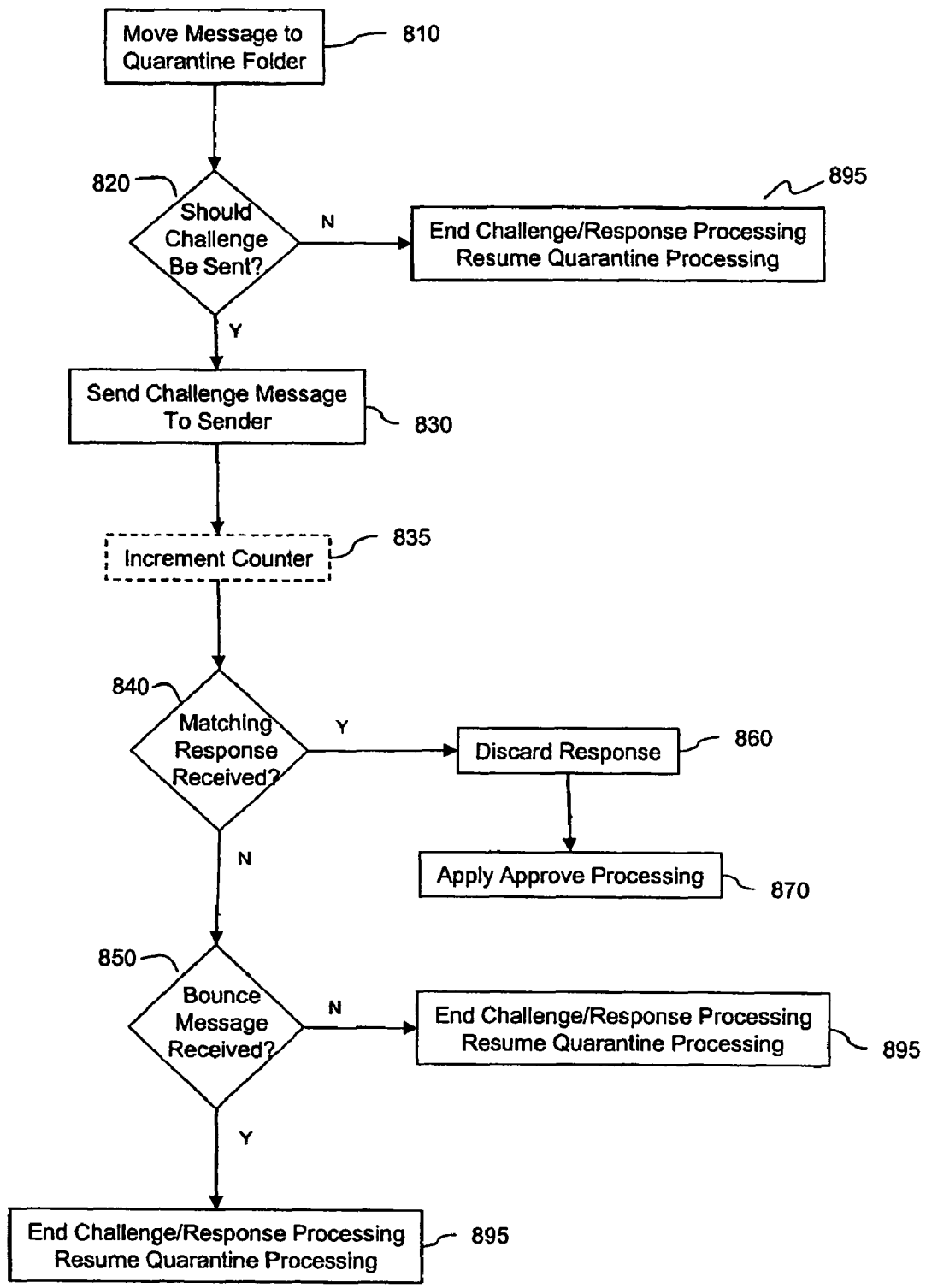
FIG. 8 depicts a flowchart of a method for challenge/response processing, according to an embodiment of the present invention.

FIG. 8 depicts a flowchart 800 of a method for originating a challenge/response, according to an embodiment of the present invention. Flowchart 800 begins at step 810 when a message is moved to the quarantine folder.

In step 820, a determination is made whether a challenge message should be sent to the sender address. This step is optional. If a challenge message is to be sent, operation proceeds to step 830. If no challenge message is to be sent, operation proceeds to step 895.

In an embodiment, the system stores a maximum number of challenges field. The maximum number of challenges field indicates the number of challenges that can be sent to an address during a defined period of time. The system may store one maximum number of challenges value that applies to all sender addresses. Alternatively, the system may store multiple maximum number of challenges values. The maximum number of challenges and/or predefined period of time can be preprogrammed (e.g., default values) or can be configured by a user.

In this embodiment, the system stores a counter for each sender address to which a challenge has been sent. In addition, an optional timer may be used to track the defined period of time. Each time a challenge is sent to an address during the defined period of time, the counter associated with that address is incremented. When the defined period of time has elapsed, the counter and optional timer are reset. In step 820, the value of the counter for the address is compared to the value of the maximum challenge field. If the counter value is equal or greater than the maximum challenge field, then no challenge is to be sent and operation proceeds to step 895. If the counter value is less than value of the maximum challenge field, operation proceeds to step 830.

For example, the maximum challenge field has a value of one and the predefined period of time is one day. Therefore, only one challenge a day can be sent to each sender address. If an unknown sender sends several messages in rapid succession, the sender only receives one challenge for all the messages. If the unknown sender sends an additional message significantly later (e.g., the next day), the sender will receive a new challenge.

Additionally or alternatively, the determination of whether to send a challenge message to a sender address is based on whether the sender has software which is capable of automatically responding to a challenge message. In this embodiment, the sender of the original message includes in the header a field indicating the ability to autorespond to a message. For example, the header may contain the following: "X-Can-Autorespond: True." When a message contains an indication that autoresponse is supported, a challenge is to be sent and operation proceeds to step 830. When a message does not contain this indication or contains an indication that autoresponse is not supported, no challenge is to be sent and operation proceeds to step 895.

In this embodiment, the challenge/response cycle is hidden from both parties. Limiting challenges based on the ability to autorespond is beneficial for cases where one or more senders find manual response to a challenge overly intrusive.

In step 830, the challenge message is sent to the sender. In an embodiment, to ensure that the challenge message is not sent to a mailing list or some other inappropriate address, challenge messages are only sent to the SMTP envelope sender, often recorded in the Return-Path header of the received message. This address is the address to which MTAs typically send delivery failure notifications. Most mailing list managers and other e-mail software are designed to handle delivery failure notifications. In fact, the action of quarantining a message can be interpreted as a form of delivery failure or warning.

In an embodiment, a challenge has the same structure as other delivery failure or warning messages. In the challenge message, the SMTP envelope sender (Return-Path) is empty to prevent bounce or challenge loops. This is the technique proscribed by the SMTP RFC to prevent bounce loops for other delivery notifications.

Given the structure of spam messages, most challenges are sent to invalid addresses and as a result, the challenges bounce. By setting the envelope sender to null, no bounce message is generated. Because the From or Reply-To lines contain a valid address, a user or program aware of challenges can successfully reply.

In step 835, the challenge counter for the sender is incremented. This step is optional and will only be present if the determination in step 820 is based on a comparison of the maximum number of challenges to the challenge counter for a sender.

To respond to the challenge, the original sender can use the typical reply feature that exists in almost all MUAs. This type of respond action usually requires activating (e.g., "clicking") a reply button followed by activating (e.g., "clicking") a send button.

In step 840, a determination is made whether a matching response to the challenge was received. If no matching response was received, operation proceeds to step 850. If a matching response was received, operation proceeds to step 860.

In basic challenge/response techniques, matching responses to challenges is often difficult. Many challenge/response techniques involve including a URL with an embedded identifier in the challenge message. The inclusion of an identifier allows a response to be matched to the associated challenge. However, in many conventional challenge/response techniques, a third party web site is used to host the challenge/response mechanism. Individual users of the challenge/response mechanism do not host the challenge/response software on their own systems. Because many people and organizations are uncomfortable allowing a third party to monitor their e-mail traffic, a challenge/response system that only involves direct communication between the two parties and preserves privacy is needed.

Another difficulty in designing the challenge/response mechanism is accommodating all of the various MUAs and MTAs that are in use. In general, the From or Reply-To address and some part of the subject are typically preserved when a user activates the send reply then send buttons. For example, when a user activates a reply button, most MUAs begin composing a new message with the address in the From line, or the Reply-To line, if present, as the recipient of the reply. In addition, most MUAs also preserve the original subject line of the message and include an indication that the message is a reply (e.g., by prepending the string "Re:" or some other appropriate prefix, if one is not already present).

Some challenge/response mechanisms use synthetic From, Reply-To, or Return-Path headers to embed information to allow the entity issuing the challenge to match a response. The following is an example of this technique. In this example, user 1 (alice@somewhereelse.com) sends a message to user 2 (bob@somewhere.com) having the following information in the header:

|  |  |
|---|---|
| From: | alice@somewhereelse.com |
| To: | bob@somewhere.com |
| Subject: | lunch? |

If user 1 is an unknown sender to user 2 (i.e., the message is quarantined), user 2 or user 2's mail system sends the following challenge to user 1:

|  |  |
|---|---|
| From: | bob-challenge-123456@somewhere.com |
| To: | alice@somewhereelse.com |
| Subject: | Who goes there? |

When user 1 replies to the challenge from user 2, the response message is sent to the address "bob-challenge-123456@somewhere.com." The MTA of user 2 may be able to recognize this synthetic address as a response to the challenge. However, many users do not have access to their MTA and therefore, do not have the ability to create and monitor these special addresses.

In an embodiment of the present invention, in step 840, data in the subject line is used to track responses to challenges. For example, the challenge message includes an indication that the message is a challenge and a challenge/response identifier. The responding system includes the challenge/response identifier in the response message. After a challenge is sent, the subject line in all incoming messages is scanned to identify a response that contains the unique identifier.

For example, using the example message above from user 1 to user 2, the challenge sent by user 2 includes the following information:

|  |  |
|---|---|
| From: | bob@somewhere.com |
| To: | alice@somewhereelse.com |
| Subject: | Re: lunch? [challenge #123456] |

When user 2 receives the challenge and activates the "reply" then "send" button, the response message includes the following information:

|  |  |
|---|---|
| From: | alice@somewhereelse.com |
| To: | bob@somewhere.com |
| Subject: | Re: lunch? [challenge #123456] |

User 1 can then match the response to the challenge using the data included in the subject line.

This method of matching responses to challenges can be implemented by a user with no control over their MTA. In addition, the method works with existing MUAs and only involves communication between two parties. Most of the original subject line of the message is preserved, allowing the recipient of the challenge to relate the challenge to the original message sent. Note that in some cases, the original subject line may be truncated in order to fit the challenge/response identifier in the subject line.

In step 860, the received response message is discarded. In step 870, approve processing is applied to the message or messages from the sender. Approve processing is described in section 2.2.1.

In step 850, a determination is made whether a bounce message was received in response to the challenge. This step is optional. This step is beneficial for situations where it is impractical to set the envelope sender of a challenge such as when the user's MTA does not provide that capability. In these situations, a large number of challenges could result in bounces. If the user saw a bounce message for each challenge message sent (e.g., for each spam message), the received bounce messages could be as burdensome as the spam messages. Therefore, screening the user from these received bounce messages is desirable.

After a challenge is issued, received bounce messages are scanned. In an embodiment, because bounce messages are not guaranteed to preserve the original subject of the message, the body and attachments of the received message are searched for the challenge identifier. If a challenge identifier is found that matches the identifier of the challenge issued, the bounce message is assumed to be the result of the challenge and is hidden from the user. If the bounce does not contain a challenge identifier that matches the identifier of an issued challenge, the bounce message is assumed to be from a message that the user sent and the bounce message is moved to the user's inbox. Thus, bounces that result from challenges are hidden from the user but bounces that result from user initiated mail are presented to the user.

Additionally or alternatively, the received bounce messages are scanned for the SMTP Message-Id of sent challenges. Like the subject, the message-id of the original message is not guaranteed to be present in a bounce.

In an embodiment, when a bounce to a challenge is received, the address is added to the screening list as a negative screening list entry (or added to the negative screening list, if two screening lists are supported) to indicate that the address is invalid. This step is optional.

In an embodiment, challenge and response messages are hidden from the user so that they are not placed in the inbox, sent or deleted folders. The challenge/response messages may be automatically deleted or archived in a different folder.

2.1.6.2 Automatically Responding to Challenges

Figure 9:
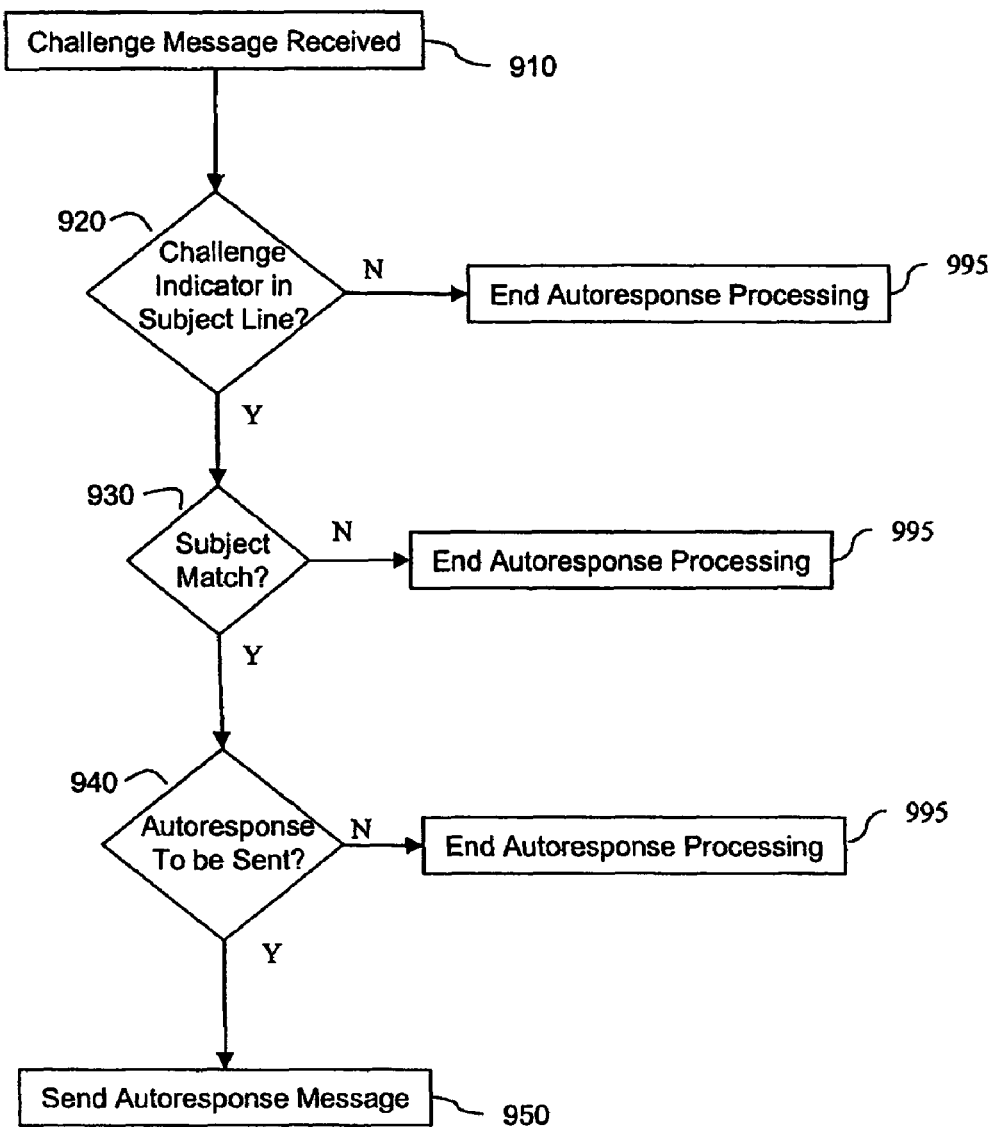
FIG. 9 depicts a flowchart of a method for automatically responding to a challenge, according to an embodiment of the present invention.

FIG. 9 depicts a flowchart 900 of a method for automatically responding to a challenge, according to an embodiment of the present invention. Flowchart 900 begins at step 910 when a message is received.

In step 920, a determination is made whether a challenge indicator is included in the message. If the message includes a challenge indicator, operation proceeds to step 930. If the message does not include a challenge indicator, operation proceeds to step 995.

In step 930, a determination is made whether the subject of the challenge message matches the subject of a message sent by the user. In an embodiment, a subject list is stored. The subject list includes the subject of messages originated by the user. If the subject of the challenge messages matches the subject of message sent by user, operation proceeds to step 940; else, operation proceeds to step 995.

When a challenge message is received, the subject of the message is compared to a normalization of the subjects contained in the subject list. The normalization considers common prefixes such as "Re:", "Fwd:", and "Fw," and canonicalizing white space and case as well as limiting the length of the subject to account for differences in what various MUAs and MTAs are willing to transport as well as the possible truncation needed for the challenge to make room for the challenge identifier.

In step 940, a determination is made whether an autoresponse message should be sent. This step is optional. In an embodiment, step 940 is performed prior to step 930. In an embodiment, the system stores a maximum number of autoresponses a given client is willing to send per unit of time and an autoresponse counter. For example, the maximum number of autoresponse can be a fixed number (e.g., 50 per day). Alternatively or additionally, the maximum number can vary depending on various factors such as the number of messages sent by the user which is likely to correlate with the number of challenges that a user might receive. In step 940, the value of the counter is compared with the defined maximum. If the counter has a value equal or greater than the defined maximum, no response message is sent. If the counter value is less than the defined maximum, operation proceeds to step 950 and the counter is incremented; else operation proceeds to step 995.

Step 940 provides protection against cases where a malicious originator or spammer is able to guess a recent subject line and forges a message that appears to come from that user with that subject. Step 940 also provides protection against challengers who may become confused and send too many challenges.

In step 950, a response is automatically constructed and sent to the sender of the challenge. Both the received challenge and automatic response are hidden from the user. To help prevent challenge/autoresponse loops, a special autoresponse indicator is included in the response. For example, the "#" character in the challenge message is replaced with a "*" character. The following is an example of a challenge/autoresponse sequence. The following challenge message is received by user 1:

| From: | bob@somewhere.com |
|---|---|
| To: | alice@somewhereelse.com |
| Subject: | Re: lunch? [challenge #123456] |

The following autoresponse will be generated:

| From: | alice@somewhereelse.com |
|---|---|
| To: | bob@somewhere.com |
| Subject: | Re: lunch? [challenge *123456] |

When user 2's system receives a message that contains an autoresponse indicator (e.g., *123456) in the subject, the system will not attempt to challenge or autorespond to the message.

2.1.6.3 Authenticated Challenge/Response Processing

Figure 10:
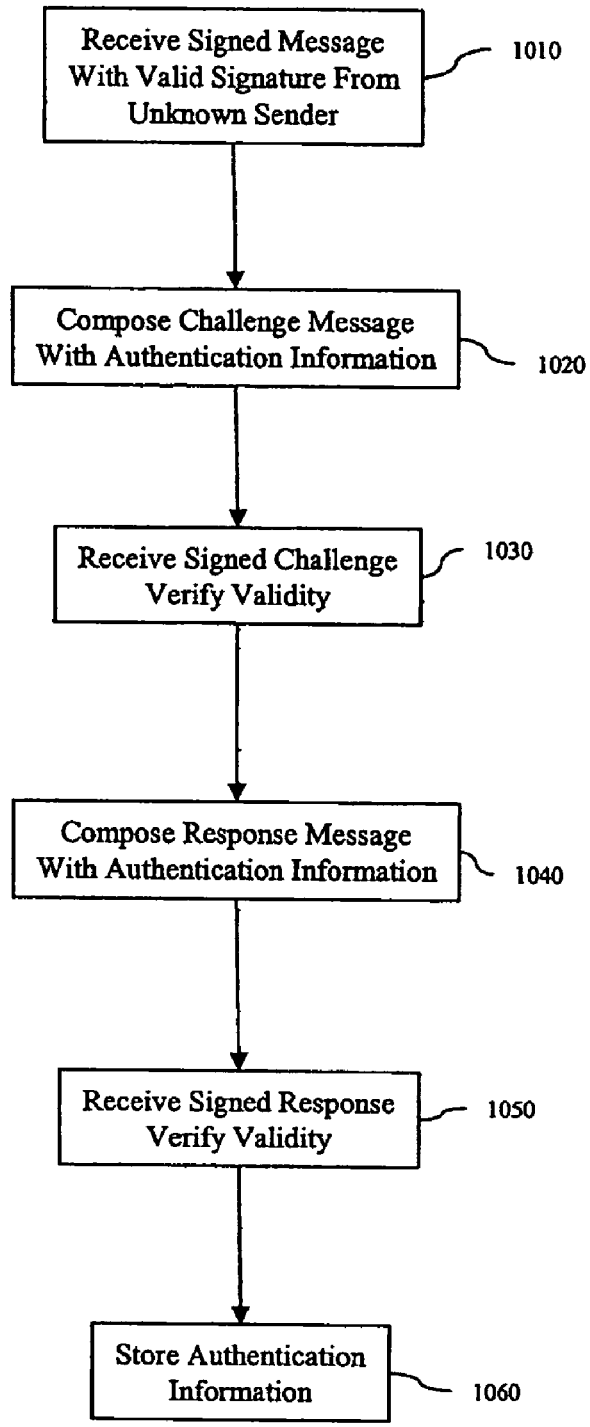
FIG. 10 depicts a flowchart of a method for authenticated challenge/response processing, according to an embodiment of the present invention.

FIG. 10 depicts a flowchart 1000 of a method for authenticated challenge/response processing, according to an embodiment of the present invention. To address the possibility that a malicious originator or spammer could trick someone into responding to a challenge issued by the malicious originator or spammer, digital signatures can be used to authenticate both parties during the challenge/response cycle. The digital signatures used to authenticate challenges and responses can use S/MIME, PGP, or similar format. In the signed messages described below, a certificate associated with the signer or at least the public key of the signer must be included. Typically, signing a message means computing a digest (e.g., hash) of the message and signing that digest with the sender's private key. The signed digest and public key (or equivalents) are transmitted with the message. The recipient can detect if the message was altered in transit by computing the digest (e.g., hash) of the message and verifying that the signed hash received was generated by the private key corresponding to the public key included in the message. This level of validity checking identifies messages that have been altered after the message was signed. The exact details of the authentication process are dependent upon the type of signature algorithm used. For example, in S/MIME, self-signed certificates are sufficient for this validation.

In step 1010, a signed message with a valid signature from an unknown sender (user 1) is received by user 2. As described above, the message is stored in the quarantine folder.

In step 1020, a challenge message including authentication information (e.g., signed hash of original message) is composed. The message is signed by user 2 and sent to user 1.

In step 1030, user 1 (the original sender) receives the signed challenge and verifies the validity of the signature. If the signature is valid, authentication data is extracted from the message and the validity of the challenge is verified. For example, if the public key is one of the keys owned by user 1 and the authentication data is valid, operation proceeds to step 1040. If public key and/or authentication data is invalid, operation proceeds to step 1095 where processing ends.

In step 1040, user 1 constructs a response message that includes authentication data associated with the challenge (e.g., signed hash of the challenge). User 1 signs the response and sends the response to user 2.

In step 1050, user 2 (the original recipient) receives the signed response and verifies the validity of the signature. If the signature is valid, authentication data is extracted from the message (e.g., signed hash of challenge). If the authentication data was generated using one of user 2's private keys and is valid, user 2 knows that the response was received as a result of a challenge that user 2 sent. Also, user 2 can determine if the response was signed with the same private key that signed the original message. If it was, the recipient knows that the owner of that private key has control of the e-mail address that they claim to be.

After the authenticated challenge/response cycle is completed, in step 1060, the systems associated with user 1 and user 2 store the public keys (or entire certificates) associated with each address. The public keys can then be used to detect future man-in-the-middle or similar types of malicious attacks. In an embodiment, the authenticated challenge/response cycle can be used as a public key exchange between two parties. The whole challenge/response cycle does not need to involve storing state about specific messages that each party sends. The signature validation serves that purpose in a stateless way. If an invalid signature (e.g., message has been tampered with) is detected, the process aborts and the message is treated as if it is unsigned.

After each side of a communication has knowledge of the other side's public keys, the system can automatically promote all communication between the parties to use encrypted mail without impacting the user. This method solves one of the long standing problems of ad-hoc public key discovery for sending encrypted mail. No central authority is needed so long as the users are willing to accept the risk that their initial communication might be altered by a malicious party in the middle of their communication.

2.1.6.4 Integrating Challenge/Response Processing in an MTA

In addition to implementing the challenge/response processing described above in a MUA, challenge/response processing can also be integrated with the MTA. If bandwidth and storage savings are important, the MTA can send a challenge message before it accepts the SMTP data. The challenge message may be done via SMTP or some other protocol such as HTTP. Also, the original SMTP session may wait on the DATA command for a response to arrive or it may immediately end the session until after a response is received. For the authenticated challenge/response, the DATA would need to be received in order to validate the signature.

The MTA can be made aware of each user's screening list as well as each user's private keys (and potentially certificates) so that it can execute the same processes described above. The MUA software can communicate this data to the MTA via a central database, via a direct communication (such as HTTP or raw IP), or by sending special messages through the system. This combination of the user interface on the client (MUA) affecting the state on the server (MTA) allows the processes described above to be implemented in the most efficient way across both entities.

2.2 Quarantine Message Processing

Figure 11:
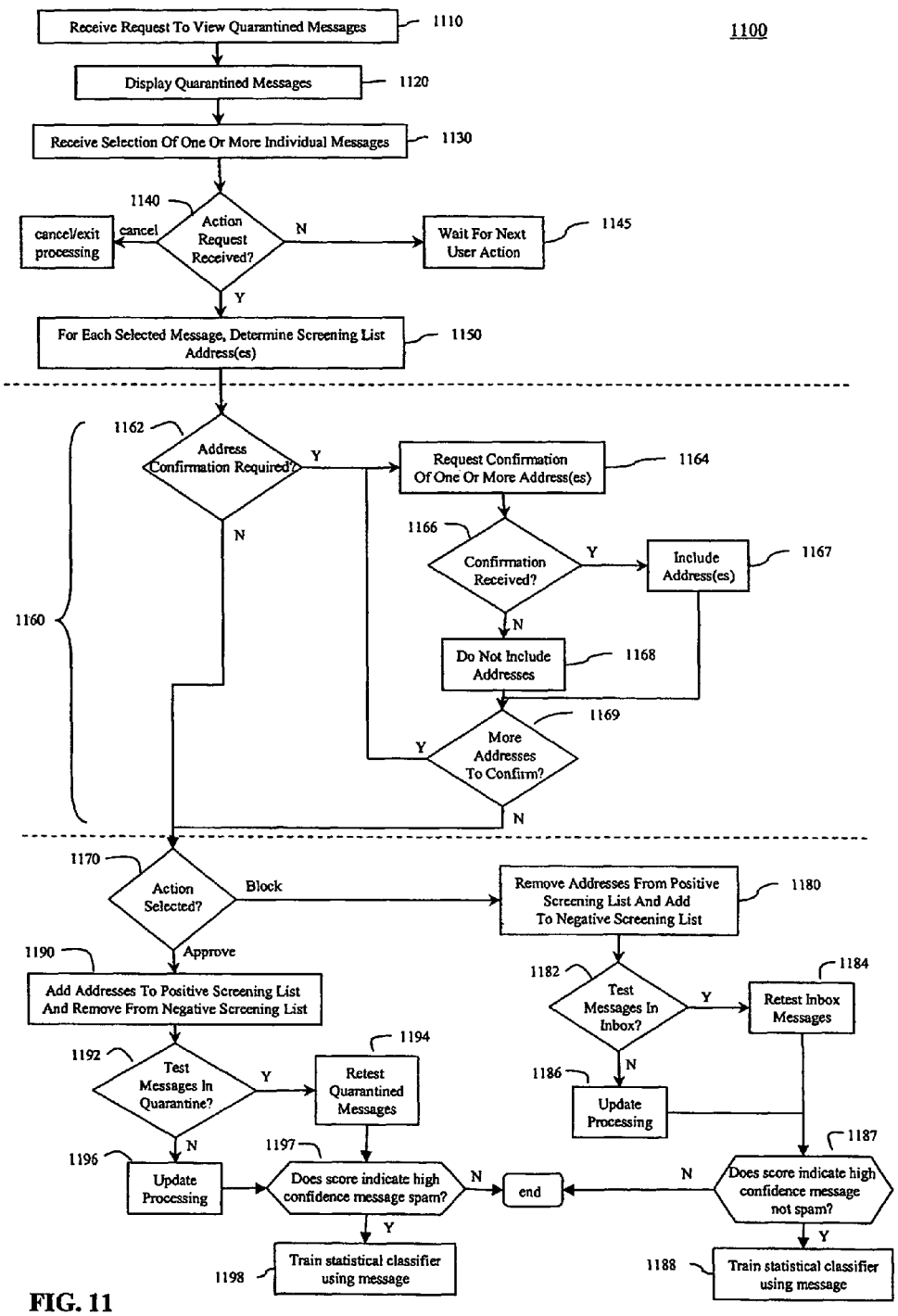
FIG. 11 depicts a flowchart of a method for processing quarantined messages, according to an embodiment of the present invention.

FIG. 11 depicts a flowchart 1100 of a method for processing quarantined messages, according to embodiments of the present invention. Note that some steps shown in flowchart 1100 do not necessarily have to occur in the order shown. Flowchart 1100 begins at step 1110 when a request to view quarantined messages or a request to access a Quarantine panel is received. A request could include activating a button on a tool bar, highlighting a menu item, activating an icon or link through a reminder panel, balloon or icon, or selecting the quarantine folder through the MUA interface.

In an embodiment, a quarantine reminder icon, panel, and/or balloon can be configured to come up automatically if there are unreviewed messages in the quarantine folder. The reminder helps an end-user remember to review messages located in the quarantine folder. The display time and/or interval for the reminder are configurable. In an embodiment, the reminder can be configured to be displayed every N hours or at specific times of day.

In step 1120, the quarantined messages are displayed. For example, the unreviewed messages are displayed in a quarantine user interface. Alternatively, all quarantine messages (both reviewed and unreviewed) are displayed in the quarantined folder.

Figure 13:
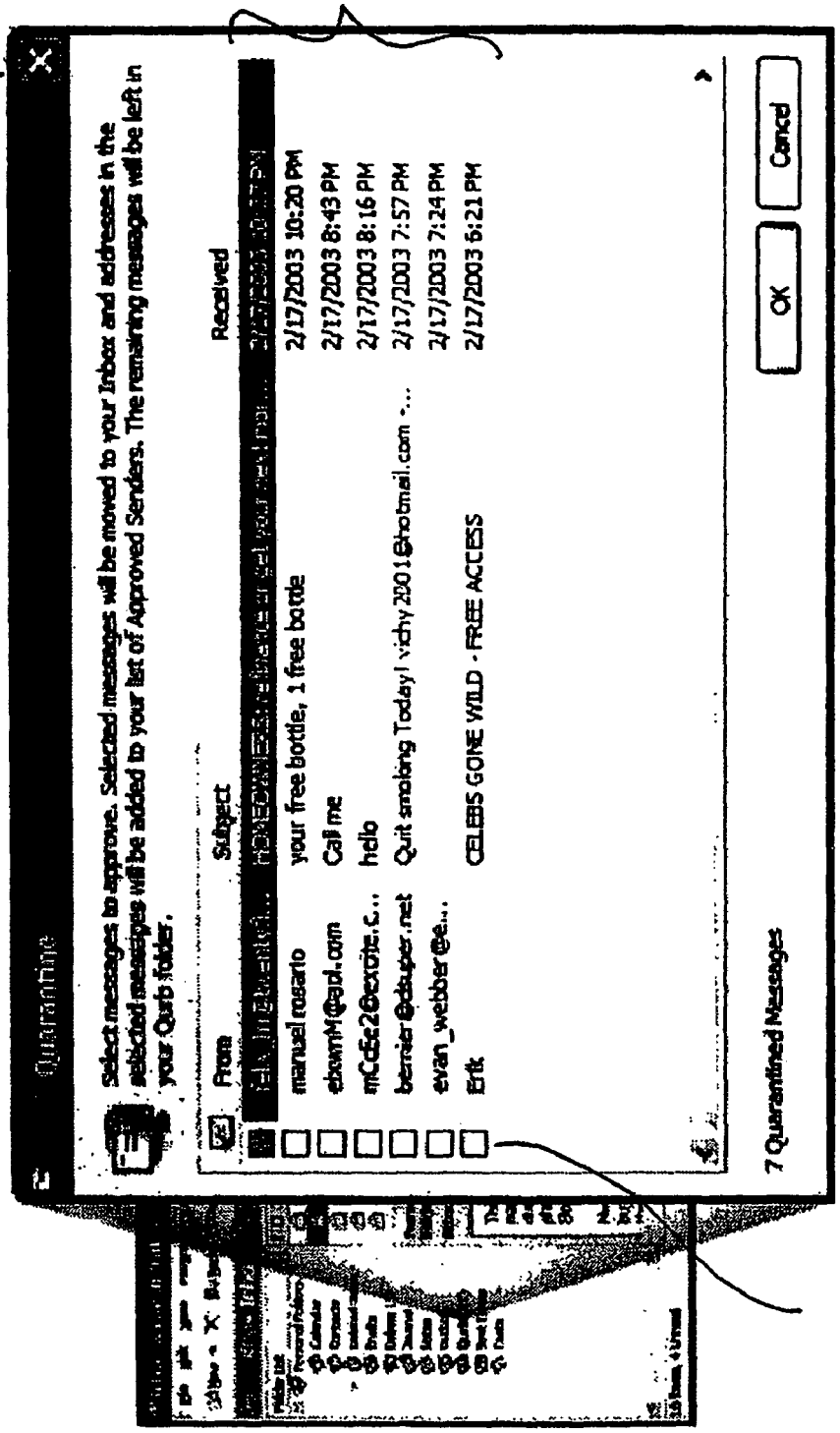
FIG. 13 illustrates an exemplary Quarantine user interface, according to an embodiment of the present invention.

FIG. 13 illustrates an exemplary Quarantine user interface 1300, according to an embodiment of the present invention. The Quarantine user interface 1300 is a panel that displays a list 1310 of all unreviewed messages in the quarantine folder. In an embodiment, the display shows a table of the sender's display name and e-mail address, the subject of the message, and the date and time the message was received. The left-most column 1320 includes check boxes, one per each row. The check boxes are used to select messages in the quarantine folder.

In an embodiment, the order and content of the display list 1310 can be configured. A number of configuration options are possible. For example, messages can be displayed according to their status on the screening list. Messages from originators on the negative screening list can be removed completely from the list.

In an embodiment, listed messages can be sorted using the spam score determined by statistical classifier 118 in step 315 of flowchart 300. Messages are listed from high confidence of not spam to high confidence of spam. This technique for sorting is particularly beneficial for users who receive high volumes of spam messages. For example, as described above, a message from an unknown sender is placed in the quarantine folder. The quarantine folder may also include the recent spam messages received for the user. If the message from the unknown sender was expected or unexpected but still "non-spam," the user will have to manually filter through all the messages in the quarantine folder to pull out the non-spam message. If the user has a high volume of spam and only one or two non-spam messages, this manual filtering can be time consuming and prone to errors. Therefore, a technique to highlight the potentially non-spam messages in the quarantine folder and to deemphasize the messages that have high confidence of being spam is invaluable.

In addition or alternatively, messages having a score within a predetermined range indicating high confidence of spam are shaded a light color (e.g., gray) to deemphasize the message. For example, messages with a score above a certain threshold (e.g., above 85) are shaded gray. The predetermined "gray message" range or threshold is user configurable. In a further embodiment, messages having score within a predetermined range, can be hidden from the user (i.e., not displayed in the Quarantine folder). For example, messages above a certain threshold (e.g., above 95) are hidden. The predetermined "hide message" range or threshold is also user configurable.

The user interface can include controls to allow the display of only unreviewed messages. The quarantine user interface can include a search box to allow searching of the displayed messages. The display can include a short preview of the messages when the user selects or highlights a message in the list. The display (e.g., columns) can be customized by the user.

In an embodiment, offensive words can be redacted from text displayed on the screen. Although the quarantine panel only exposes the user to the sender's name, e-mail address, and subject line of the message, some users may be offended by or wish to shield their children from certain language that can appear in those fields. In addition, because the quarantine panel also allows the user to see a plain text preview of the message either via a pop-up window or via a preview area, offensive language can also appear there. In this embodiment, offensive words (or a string of characters that look similar to offensive words) are replace with another character such as a '*'. In this way, the user can see when a message might be offensive without being directly exposed to the language.

For example, assume that the word 'potato' is an offensive word. The user interface would render this as '******'. The same technique can be used to redact strings made of characters which when rendered on the user's screen produce something visually similar to 'potato' such as 'p0tat0' or 'pot@to.' Words can also be redacted based on their frequency of appearance in spam versus non-spam messages.

For additional details on searching methods that can be used with the above filtering process, see provisional patent application U.S. Ser. No. 11/245,100, filed Oct. 7, 2005 entitled "Method, Apparatus, and Computer Program Product for Searching Digital Data", which is incorporated by reference herein in its entirety.

In step 1130, one or more individual quarantined messages are selected. In an embodiment, the selection includes highlighting a check box located next to a message. As would be appreciated by persons of skill in the art, other method of selection could be used.

In step 1140, a determination is made whether an action request is received. An action request includes an approve request or a block request. If no action request is received, operation proceeds to step 1145. If an action request is received, operation proceeds to step 1150. In an embodiment, in step 1140, the determination also includes determining whether a cancel or exit action was received. If a cancel or exit action was received, operation proceeds to step 1142.

In step 1142, cancel/exit processing is performed. Cancel/exist processing ends quarantine processing. In an embodiment, the state of the messages (reviewed/unreviewed) in the quarantined folder is unchanged.

In step 1145, the system waits for an action from the user.

In step 1150, for each message selected in step 1130, a determination is made which message addresses to use during approve or block processing. These addresses are collectively referred to as an approve/block list. The approve/block list can include any number of addresses. In an embodiment, the approve/block list includes a superset or set of addresses equal to the set of addresses that would be included in a message address list if step 320 of FIG. 3 was performed on the message.

In step 1160, confirmation processing is performed. Confirmation processing is optional. In an embodiment, a user can configure confirmation processing. For example, a user can determine whether confirmation processing is performed and whether bulk confirmation of multiple addresses or individual confirmation is to be applied.

In step 1162, a determination is made whether confirmation of each address to be affected by the action is required. In general, a user usually expects approve and block to operate on the original sender (e.g., From address), but may not expect it to operate on the resender or resenders in a message. Therefore, in certain applications, it is advantageous to confirm with the user which addresses are to be affected by the operation. If confirmation is required, operation proceeds to step 1164. If no confirmation is required, operation proceeds to step 1170.

In step 1164, a request is made for confirmation of one or more addresses. In an embodiment, the request is a simple dialog showing one or more addresses that will be affected with OK or CANCEL buttons. The confirmation dialog may allow the user to choose what action should be taken on an address by address basis.

In step 1166, a determination is made whether confirmation is received. If confirmation is received, operation proceeds to step 1167. If confirmation is not received, operation proceeds to step 1168.

In step 1167, the confirmed addresses are included in the approve/block address list.

In step 1168, the addresses that are not confirmed are not included in (or are removed from) the approve/block list.

In step 1169, a determination is made whether more addresses remain to be confirmed. If no more addresses remain to be confirmed, operation proceeds to step 1170. If more addresses remain to be confirmed, operation proceeds to 1164.

In 1170, the selected action is identified. If Block was selected, operation proceeds to step 1180. If Approve was selected, operation proceeds to step 1190.

In step 1180, Block processing is applied to the approve/block list. At a high level, Block processing removes addresses on the approve/block list from the positive screening list (or as positive entries) and adds the addresses on the approve/block list to the negative screening list (or as negative entries). Exemplary Block processing is described below in section 2.2.1. Block processing is optional. In an embodiment supporting only a single type of action, steps 1180-1186 would not be included.

In step 1182, a determination is made whether messages in the inbox are to be retested based on the updated screening list. This step is optional. If inbox messages are to be retested, operation proceeds to step 1184. If inbox messages are not to be retested, operation proceeds to step 1186.

In step 1184, the messages in the inbox are retested following the method described in Section 2.1. Operation then proceeds to step 1187.

In step 1186, update processing is performed. Operation then proceeds to step 1187.

In an embodiment, additional steps 1187 and 1188 are performed to train statistical classifier 118. These steps are optional. Training of statistical classifier 118 is described in more detail in Section 2.4.1. As described above, during quarantine processing, the user opted to block the message. The user blocking of the message provides an authoritative indication of the status of the message (e.g., message is a spam message).

In step 1187, a determination is made whether the generated score indicated a high confidence that the message was not spam. If the generated score indicates a high confidence that the message was spam, the score is consistent with the authoritative status indication and processing ends. If the generated score indicates a high confidence that the message was not spam, the score is inconsistent with the authoritative status indication and considered erroneous. Operation then proceeds to step 1188.

In step 1188, the received message is marked as a spam message and used to train statistical classifier 118. In this manner, statistical classifier 118 is not trained using every received message. Instead, statistical classifier 118 is only trained when an error or discrepancy is found between the authoritative status indication and the spam score.

As would be appreciated by persons of skill in the art, step 1187 could determine whether the score indicated a high confidence that the message was spam.

In step 1190, Approve processing is applied to the approve/block list. At a high level, Approve processing adds addresses on the approve/block list to the positive screening list (or as positive entries) and removes the addresses on the approve/block list from the negative screening list (or as negative entries). Exemplary Approve processing is described in Section 2.2.1.

In step 1192, a determination is made whether the quarantined messages are to be retested based on the updated screening list. If quarantined messages are to be retested, operation proceeds to step 1194. If quarantined messages are not to be retested, operation proceeds to step 1196.

In step 1194, the quarantined messages are retested following the method described in Section 2.1.

In step 1196, update processing is performed. For example, selected messages are run through the approve operation, resulting in the moving of approved messages to the user's Inbox. Unselected messages are marked as "reviewed" and left in the quarantine folder.

In an embodiment, during update processing, message status is altered based on inaction by the user. For example, when a user declines to approve a message from a sender for a predetermined number of times (e.g., three times), the sender is automatically added as a negative screening list entry. This allows persistent spammers to have their addresses added to a negative screening list without explicit user action.

In an embodiment, additional steps 1197 and 1198 are performed to train statistical classifier 118. These steps are optional. Training of statistical classifier 118 is described in more detail in Section 2.4.1. As described above, during quarantine processing, the user opted to approve the message. The user approval of the message provides an authoritative indication of the status of the message (e.g., message is a non-spam message).

In step 1197, a determination is made whether the generated score indicated a high confidence that the message was spam. If the generated score indicates a high confidence that the message was not spam, the score is consistent with the authoritative status indication and fail processing ends. If the generated score indicates a high confidence that the message was spam, the score is inconsistent with the authoritative status indication and considered erroneous. Operation then proceeds to step 1198.

In step 1198, the received message is marked as a non-spam message and used to train statistical classifier 118. In this manner, statistical classifier 118 is not trained using every received message. Instead, statistical classifier 118 is only trained when an error or discrepancy is found between the authoritative status indication and the spam score.

As would be appreciated by persons of skill in the art, step 1197 could determine whether the score indicated a high confidence that the message was not spam.

In an embodiment, quarantine processing can be extended to provide parental control. For example, the filtering interface can be hidden from a child's e-mail account. The parent can then control the child's screening list and review the child's quarantine folder. An additional password can be used to protect the screening list and the quarantine folder. A parent can exercise this control through the same computer or over a network connection.

2.2.1 Approve and Block Processing
2.2.1.1 Simple Approve and Simple Block

In an embodiment, Approve processing (step 1190) is simple Approve processing and Block processing step (1180) is simple block processing. In simple approve and block processing, the same set of addresses is used for the message address list in the quarantine message processing and the sender address list in match processing.

In this embodiment, approving a message adds all of the addresses on the list to the positive screening list (or adds as positive entries) and removes all of the addresses from the negative screening list (or removes as entries on the screening list). Blocking a message adds all of the addresses on the list to the negative screening list (or as negative entries) and removes all of the addresses from the positive screening list (or as entries on the screening list).

When a user blocks a message (or fails to approve it from quarantine, as described above in Section 2.2), if the message has one of the standardized mailing list headers, the appropriate action is taken to unsubscribe the user from the mailing list. Typically, this step involves using the URI in a List-Unsubscribe: header to automatically send an e-mail to POST to a URL.

Approving a message under simple approve ensures that if a future message is sent by any of the addresses on the message address list, the message will pass match processing and be placed in the user's inbox. Blocking a message under simple block ensures that if a future message is sent by any of the addresses on the message address list, the message will fail match processing and be quarantined or discarded.

2.2.1.2 Broad Approve and Simple Block

In an embodiment, approve processing (step 1190) is broad approve processing and block processing (step 1180) is simple block processing. Because the likelihood of receiving a message from a non-spammer or non-malicious originator with the address of a spammer or malicious party as one of the recipients is low, the approve operation can be more aggressive in adding addresses to the positive screening list than described above in reference to the simple approve operation.

In the more aggressive broad approve process, additional addresses are added to the approve/block list. For example, in the broad approve process, all of the recipient addresses in the message are added to the approve/block list (in addition to the addresses collected for simple approve, described above). The addresses in the expanded approve/block list are removed from the negative screening list (or as negative entries) and added to the positive screening list (or added as positive entries to the screening list).

For example, consider the message having the header shown below in Example 7. If this message were approved using broad approve, addresses A, B, C, D, E, F, and G would be added to the approve/block list. These addresses would then be removed from the negative screening list (or as negative entries) and added to the positive screening list (or added as positive entries to the screening list). Future messages that contained any of the addresses on the approve/block list would then pass match processing.

If this message were blocked using simple block process, A and G would be added to the approve/block list. These addresses would then be removed from the positive screening list and added to the negative screening list. Any future messages from these addresses would fail match processing.

Example 7

| From: | A |
| To: | B, C, D |
| Cc: | E, F |
| List-Post: | G |

2.2.1.3 Deep Approve and Deep Block

In an embodiment, approve processing is deep approve processing and block processing is deep block processing. A limitation of the broad approve process is that the approve process is not automatically applied to messages that subsequently pass match processing. For example, assume a broad approval is applied to a message having the following header during quarantine message processing.

| From: | A |
| To: | B |

After broad approval is applied to this message, the following message will pass match processing:

| From: | B |
| To: | A, C |

However, a subsequent message from C will not pass match processing even though it may be a response to the message from B. The deep approve operation overcomes this limitation by computing the transitive closure of all addresses that result from applying the broad approve operation to all messages that pass match processing.

In deep approve processing, broad approve process is applied to a first message during message quarantine processing. Then, when any subsequent message has an address that matches an entry on the positive screening list, a broad approve process is performed on that message during pass processing step 620 of FIG. 6.

In computing the transitive closure of the deep approve process, messages in the quarantine folder may be retested multiple times. For example, each time a message passes match processing and adds one or more addresses to the positive screening list (and removes one or more addresses from the negative screening list), additional messages may be removed from quarantine which in turn may repeat the cycle.

As described above, in reference to FIG. 2, each entry 210 may include a reference count. When a message is deep approved, each unique address in the message has the reference count of its corresponding entry on the screening list incremented by one. If the address is not on the screening list, a screening list entry is created having a reference count equal to one.

Deep block processing operates in a similar manner to deep approve processing. When a message is deep blocked, each unique address on a message has the reference count of its corresponding entry on the screening list decremented by one. If the address is not on the screening list, a screening list entry is created having a reference count equal to negative one.

In an embodiment, when a message is deep blocked, the transitive closure of the deep block operation is computed. As described in FIG. 11, messages in the inbox are retested. Messages that no longer pass the screening test described in FIG. 3 are moved to the quarantine folder. When a message fails the test, the message is deep blocked. This process can result in additional messages in the inbox failing the test and being deep blocked. Just as deep approving a single message may result in many messages moving from the quarantine folder to the inbox, deep blocking a message may result in many messages moving from the inbox to the quarantine folder.

Several variations of the deep approve and deep block processes are possible depending on the degree of aggressiveness or conservatism desired. For example, a sender list can be treated differently than the recipient list. Deep approving a message can result in the reference counts of the addresses on the sender list forced to positive values regardless of their initial reference counts. Deep blocking a message can result in the reference counts of the addresses on the sender list forced to have a negative value, regardless of their initial reference counts. In an embodiment, an even more aggressive version of deep approve forces all addresses, sender and recipient, to have positive values after a deep approve process.

2.2.2 Interaction with Signed, Domain, Name Match, and Pattern Match

When a user approves a signed message, the address is added to the screening list as an entry and the signed indicator is set to a value indicating "signed." If an non-signed entry already exists, the value of the signed indicator is changed from "unsigned" to "signed." In general, if a sender sends any signed mail from an address, the sender should only send signed messages from that address in the future.

If the user approves a message with an unsigned message for which there is already a signed entry, the user should be altered and asked (e.g., via a dialog box) whether they would like to remove the signed constraint on the entry. In an embodiment, blocking a message with an unsigned address does not remove a corresponding entry that is "signed."

The same problem exists for name match entries. Thus, name match entries are handled in the same fashion.

Domain and pattern entry types can match more than one address. In an embodiment, f an entry is created with a specific address which also matches a domain or pattern entry, the user is notified of the conflict (e.g., via a dialog box) and asked to take action to address any conflicts.

2.3. List Management

As described above, the system includes one or more screening list. In order to perform screening processing, the screening list(s) must be populated. Common sources for screening list entries include the contact folder of the user, addresses from the user's saved e-mail messages, mailing list, or addresses manually entered by a user. The screening list(s) can initially be populated automatically and/or manually. In addition, updates to the screening list(s) can also be done manually or automatically.

2.3.1 Initial Generation of the Screening List
2.3.1.1 Scan on Install

In an embodiment, when a screening list or lists are initial created, a user's saved messages are scanned. The user's contact folders are also scanned because addresses in these folders are highly likely to be positive screening list entries. The approve operation described above is performed on the saved message to populate the screening list(s) with addresses. To avoid adding potential malicious originators (or spammers) to the screening list, an algorithm is used to avoid folders that potentially contain a significant number of spam or malicious messages. For example, folders with names that contain substrings such as deleted, spam, junk, adult, bulk, quarantine, etc. are skipped. Many of these strings are used by Outlook, Outlook Express, or other e-mail programs as the default names for spam folder. In an embodiment, the algorithm contains a similar list of folder names in languages other than English.

Because most malicious originators or spammers use a unique address for each message, extraneous addresses on the positive screening list will not typically lead to additional malicious messages or spam being allowed in the user's inbox. If a malicious originator or spammer does reuse an address, the user can simply block the message (as described above) and the address will be removed from the screening list.

2.3.1.2 Manual Scan

In addition to the automatic scan described in section 2.3.1.1, a user can manually select specific messages and folders to scan and approve at any time. The ability to manually populate the screening list is beneficial in circumstances where the automatic population algorithm is inappropriate for the user, if the user imports a large number of messages or contacts after the initial scan, or if the user wants to have more control over the screening list entries.

2.3.1.3 Automatic Generation of Negative Screening List Entries

In addition to scanning folders and running the approve operation on saved messages and contacts, a similar operation can be performed to populate the negative screening list entries (or screening list). If a folder or folders are known to contain only spam or other malicious messages, those folders can be selected and the block operation can be applied to all messages and contacts in those folders. This operation can be done manually or automatically.

2.3.2 Monitoring Sent Messages

Additional entries can be added to the screening list by monitoring mail messages originated by the user. By performing the approve operation on all sent messages, the addresses to which the user sends mail will automatically be added to the screening list as positive screening entries. Therefore, replies to messages sent by the user are never quarantined unless the reply comes from an address that is different than the explicit list of recipients.

2.3.3 Shared Screening Lists

In an embodiment, the screening list(s) is populated by one or more sharing mechanisms. In an embodiment, a screening list is populated by synchronizing lists among two or more users. This type of sharing implies that users can see and manage a shared screening list. Any address that is added, removed, or modified can be seen by the other users sharing the list. This type of sharing is often useful for a single user traveling between different computers or a close group of friends, relatives, or coworkers who are willing to have a single list that anyone in the group can modify.

Additionally or alternatively, a screening list is populated through a friend of a friend population process. In the friend of a friend population process, a user can describe a list of trusted friends. When a message is tested, it is tested not only against the user's own list(s) but also against the lists of the trusted friends. It is possible to extend this network of trust an arbitrary number of degrees to create larger networks of friends. Friend of friend list population can be implemented without revealing as much private information as full list synchronization.

2.3.3.1 List Synchronization

In an embodiment, lists are synchronized via a centralized database. In this embodiment, screening lists for multiple users are stored in a single database. Each user accesses the database during approve, block, and screening processing.

Alternatively and additionally, to support users who are temporarily disconnected from the network, the shared screening list is replicated locally. When a user makes a change to the list, a change operation is sent to all users that share the list. The change is then applied to each user's copy of the list. The change communication may happen via e-mail, direct network communication between peers or through proxies, or a central database.

When conflicting changes are applied to the same entry in a screening list, conflict resolution is applied. In an embodiment, a positive screening change to an entry (for example, adding to positive screening list) is preferred to a negative screening change to an entry (for example, adding to negative screening list). As would be appreciated by persons of ordinary skill in the art, other processes for conflict resolution can be used.

2.3.3.2 Friends of Friends Lists

In an embodiment, message filtering/screening is expanded through sharing screening lists among a defined set of friends. In this embodiment, each user keeps a screening list. The Approve and Block operations described above affect only the user's personal list. The filtering operation, described in FIG. 3, is extended to test addresses in the message against the user's list as well as against the lists of designated friends. The set of friends may be extended to arbitrary degrees. For example, level 0 can represent "self", level 1 can represent friends, level 2 can represent friends of friends, and level 3 can represent friends of friends of friends, and so on. A user can select the level of trust (e.g., degree screening extended).

Figure 12:
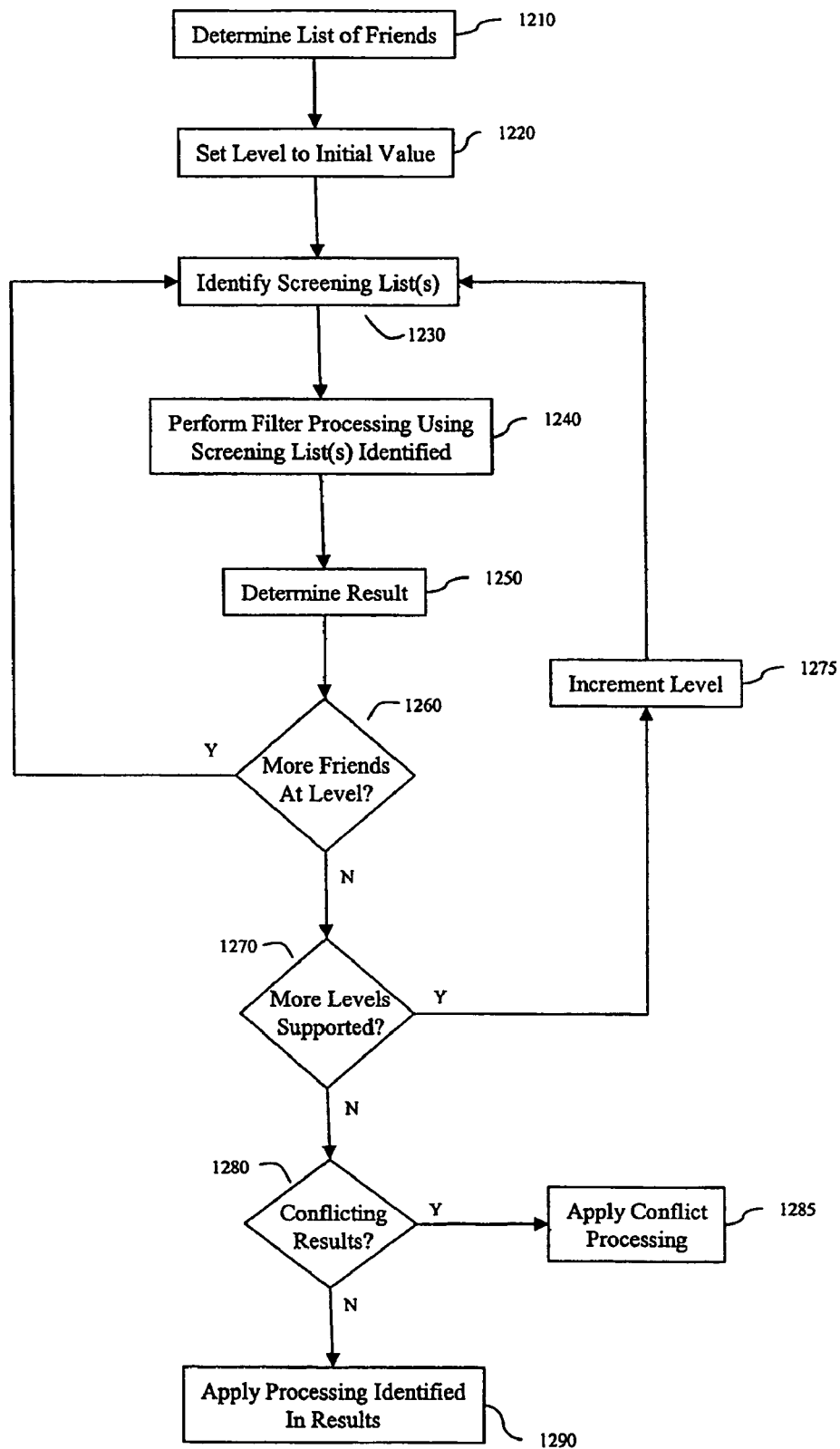
FIG. 12 depicts a flowchart 1200 of an exemplary method of filtering using friends of friends screening lists, according to embodiments of the present invention.

The transitive closure of trusted friends is a flat list for the purposes of the filtering operation. The list is sorted by degree of trust. The user's own list comes first, followed by all of the friends in level 1, then 2, etc. FIG. 12 depicts a flowchart 1200 of an exemplary method of filtering using friends of friends screening lists, according to embodiments of the present invention.

Flowchart 1200 begins a step 1210 when the designated list of friends is determined. There is a variety of ways in which lists can be shared among friends. In an embodiment, each user's list can be communicated to all of their friends, either directly or via a centralized database. However, a limitation of this approach is that each user can view the addresses on their friends' lists. This loss of privacy may be unacceptable to some users. Because each user maintains their own list, this approach avoids the synchronization issues described above in reference to list synchronization.

An additional degree of privacy can be achieved by only sharing the hashes of address on the address. This avoids the issue of casual viewing of the list but is still open to dictionary style attacks. In an embodiment, instead of sharing all the entries on each user's list, a representation of the entire list (e.g., a Bloom filter) is shared among friends. For example, a Bloom filter is a smaller hashed representation of each screening list. Whenever a user modifies their personal list, only a copy of the corresponding representation must be transmitted to their friends or stored in the centralized databases. When a Bloom filter is used, the density of the Bloom filter can be chosen to reduce false positives below any desired threshold. Low density Bloom filters can also be compressed for more efficient transmission and storage.

In step 1220, the sharing level is set at an initial value. In an embodiment, the initial value is the level representing the user. This allows a user to prefer his screening list over the screening lists in other levels.

In step 1230, the screening list associated with one or more friends at the level is identified. For example, in the initial pass, the screening list used will be the screening list associated with the user.

In step 1240, filter processing (as described above in reference to FIG. 3) is performed using the identified screening list.

In step 1250, the result of filter processing is determined. In an embodiment, if the result of filtering is pass or fail, friends of friends filter processing is ended and the appropriate processing (pass or fail) is applied to the message. If the result of filtering is quarantine, then operation proceeds to step 1260 where the message is screened against other screening list. In a second embodiment, operation proceeds to step 1260 regardless of the result of filtering. In this embodiment, the result of filtering is stored.

In step 1260, a determination is made whether any additional friends remain at this level. If friends remain at this level, operation returns to step 1230 where a screening list associated with a next set of one or more friends is identified. If no friends remain at this level, operation proceeds to step 1270.

In step 1270, a determination is made whether additional levels are indicated. If no additional levels are indicated, operation proceeds to step 1280. If additional levels are indicated, operation proceeds to step 1275.

In step 1275, the level is incremented and operation returns to step 1230 where a screening list associated with a next set of one or more friends is identified.

In step 1280, a determination is made whether any conflicting results were identified during filtering. This step is optional. Step 1280 would not be present in an embodiment where pass/fail results causes friends processing to end. In that embodiment, no possibility for conflicting results exists. If no conflicting results were identified, operation proceeds to step 1290. If conflicting results were identified, operation proceeds to step 1285.

In step 1285, conflict processing is applied. For example, conflict processing may prefer the most optimistic result (if filtering against any screening list results in pass, then message passes) or may prefer the most pessimistic result (if filtering against any screening list results in fail, then message fails).

In step 1290, the appropriate process (pass, fail, or quarantine) is applied as described above.

In an embodiment, an alert message is provided to the user during approve or block processing to alert the user if they block a message that was passed by a friend or approve a message that was failed by a friend. In an embodiment, the user is provided with the option of removing the user as a friend from their friends screening list.

2.3.4 Visited Web Sites

In an embodiment, the screening list(s) is updated based on interaction by the user with a web site. For example, one of the more common ways in which users receive e-mail for new addresses is in response to the user submitting their own e-mail address to a web site. A user may submit an e-mail address to buy a product or service on-line, sign up for a newsletter, or request some form of notification and communication. In an embodiment, the filtering system monitors the user's browser to detect when the user enters a web site and/or enters one of their e-mail addresses into the web site. The domain of the web site is then added to the screening list as a positive entry. The addition of the domain may be temporary (e.g., only for a period of days) or permanent. The addition may be triggered by simply visiting the web site. Alternatively, the addition may be only triggered when the user types one of his or her e-mail addresses into a form.

2.4 Statistical Classifier Management

Conventional filtering systems using statistical classifiers require the user to initialize the classifier database using a manual bulk training process. In these bulk training processes, the user identifies a set of "non-spam messages" and a set of "spam messages." The user can make the identification by pointing at individual messages or at one or more folders. In addition, these systems recommend that users retrain the classifier periodically to adapt to the changing techniques of spammers and/or malicious message originators. Retraining is also in bulk. Without this periodic retraining, the training database is not kept up to date and as a result, the quality of the statistical classifier is reduced.

In addition, in these conventional statistical classifier systems, training is done on every message. As a result, these systems tend to have a large classifier database with a lot of overly redundant information. This unnecessary redundancy negatively impacts the performance of the database and also the quality of the scores.

Unlike conventional systems, the filtering system described herein continuously and automatically trains the database only when an error is detected. Because the system knows an authoritative status for each message based on user action (approve or block) on quarantined messages or based on positive/negative screening processing, the system can train the classifier database in real-time without manual training by the user. In addition, training only on error reduces the size of the classifier database, increasing efficiency and score quality.

2.4.1 Statistical Classifier Training 2.4.1.1 Train on Error

In an embodiment, the filtering system automatically trains statistical classifier 118 when an inconsistency is detected between the authoritative status indication generated by the positive/negative list or user action and the spam score generated by statistical classifier 118 for a message. Train on error processing was described in the context of pass processing in Section 2.1.3, in the context of fail processing in Section 2.1.4, and in the context of quarantine processing in Section 2.2. The following section provides a high level system description of train on error processing.

Figure 14:
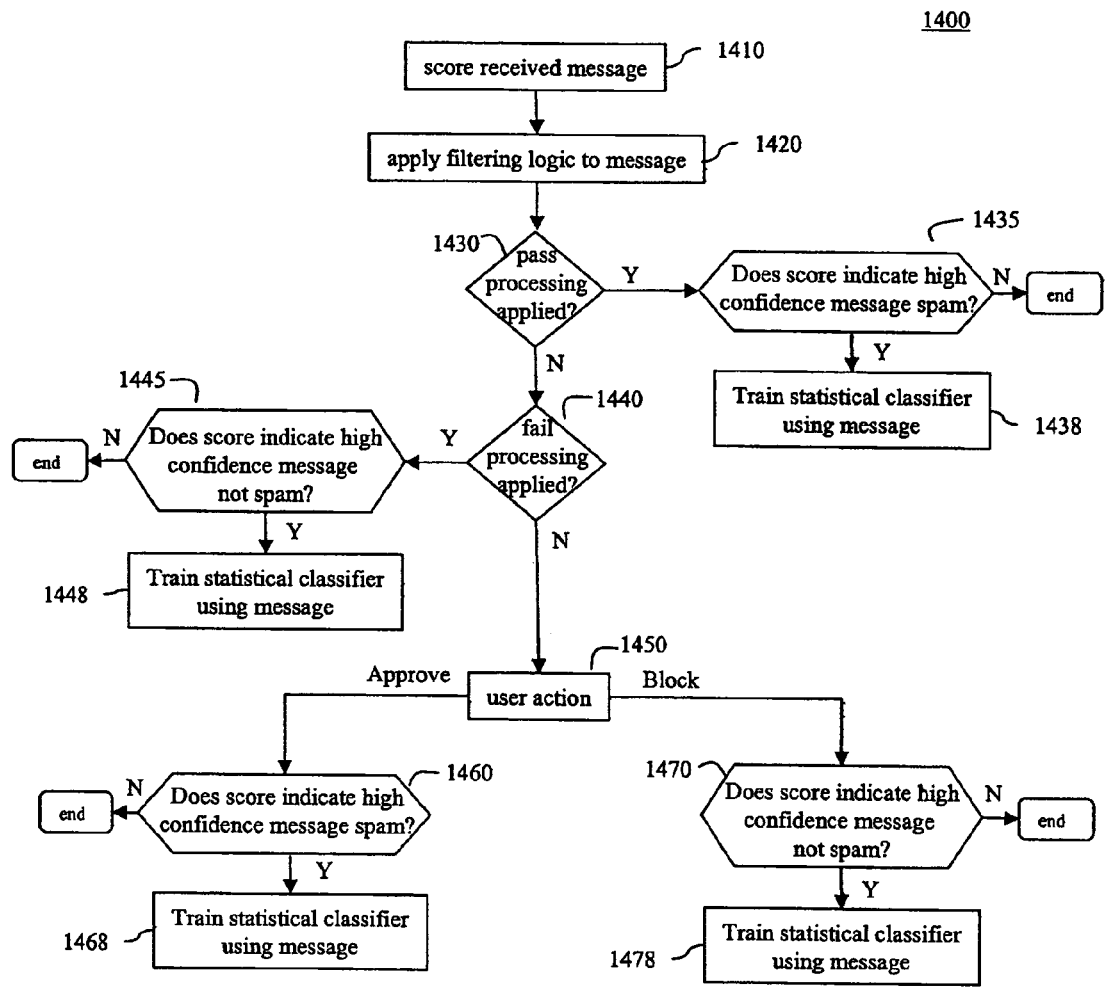
FIG. 14 depicts a flowchart of a method for automatically training a statistical classifier on a detected error, according to embodiments of the present invention.

FIG. 14 depicts a flowchart 1400 of a method for automatically training a statistical classifier on a detected error, according to embodiments of the present invention. Flowchart 1400 begins in step 1410 when a received message is scored by statistical classifier 118.

In step 1420, filtering logic is applied to the received message. Note that the filtering logic and not the score generated in step 1410 determines the status of the received message.

In step 1430, a determination is made whether pass processing is applied to the message. Pass processing is applied when one or more of the addresses associated with the message are found on the positive screening list. If pass processing is applied, operation proceeds to step 1435. If pass processing is not applied, operation proceeds to step 1440.

In step 1435, a determination is made whether the score generated in step 1410 indicates a high confidence that the received message is spam. If the score indicates a high confidence that message is spam, the score is inconsistent with the authoritative status indication and considered erroneous. Operation proceeds to step 1438. If the score does not indicate a high confidence that the message is spam, the score is consistent with the authoritative status indication and pass processing ends. As would be readily appreciated by persons of skill in the art, the determination could be whether the score generated in step 1410 indicates a high confidence that the received message is not spam.

In step 1438, the received message is marked as a non-spam message and used to train statistical classifier 118.

In step 1440, a determination is made whether fail processing is applied to the message. This step is optional. Fail processing is applied when one or more of the addresses associated with the message are found on the negative screening list. If fail processing is applied, operation proceeds to step 1445. If fail processing is not applied, operation proceeds to step 1450.

In step 1445, a determination is made whether the score generated in step 1410 indicates a high confidence that the received message is not spam. If the score indicates a high confidence that message is not spam, the score is inconsistent with the authoritative status indication and considered erroneous. Operation proceeds to step 1448. If the score does not indicate a high confidence that the message is not spam, the score is consistent with the authoritative status indication and pass processing ends. As would be readily appreciated by persons of skill in the art, the determination could be whether the score generated in step 1410 indicates a high confidence that the received message is spam.

In step 1448, the received message is marked as a spam message and used to train statistical classifier 118.

In step 1450, a user action associated with the message is received. Step 1450 is reached when the message is neither on the positive screening list or the negative screening list. That is, the message is in the quarantine folder. If a message approve action is received, operation proceeds to step 1460. If a message block action is received, operation proceeds to step 1470.

In step 1460, a determination is made whether the score generated in step 1410 indicates a high confidence that the received message is spam. If the score indicates a high confidence that message is spam, the score is inconsistent with the authoritative status indication and considered erroneous. Operation proceeds to step 1468. If the score does not indicate a high confidence that the message is spam, the score is consistent with the authoritative status indication and pass processing ends. As would be readily appreciated by persons of skill in the art, the determination could be whether the score generated in step 1410 indicates a high confidence that the received message is not spam.

In step 1468, the received message is marked as a non-spam message and used to train statistical classifier 118.

In step 1470, a determination is made whether the score generated in step 1410 indicates a high confidence that the received message is not spam. If the score indicates a high confidence that message is not spam, the score is inconsistent with the authoritative status indication and considered erroneous. Operation proceeds to step 1478. If the score does not indicate a high confidence that the message is not spam, the score is consistent with the authoritative status indication and pass processing ends. As would be readily appreciated by persons of skill in the art, the determination could be whether the score generated in step 1410 indicates a high confidence that the received message is spam.

In step 1478, the received message is marked as a spam message and used to train statistical classifier 118.

2.4.1.2 Bulk Train

In conventional bulk training, the user manually identifies a set of non-spam messages and a set of messages for training. When the classifier database is initialized, the first few messages processed are always going to be scored incorrectly because the system has no data. For example, the first message will be scored at 50% because system has no idea whether the message is non-spam or spam. After the first few messages are processed, the system rapidly converges to correct scoring. However, the first few messages are in the database, possibly adding to redundancy. This unnecessary redundancy increases the database size and reduces the quality of future scoring.

In addition, in conventional bulk training, systems typically process all of one type of message (e.g., "non-spam" messages) or a large number of one type of message first. For example, if a large number of "non-spam" messages are processed initially, the database only has non-spam data stored. The database does not include any spam data to know if a mistake had been made. Alternatively, if the system alternates between non-spam and spam messages, the situation may still arise if the user has significantly more of one message type than another.

Figure 15:
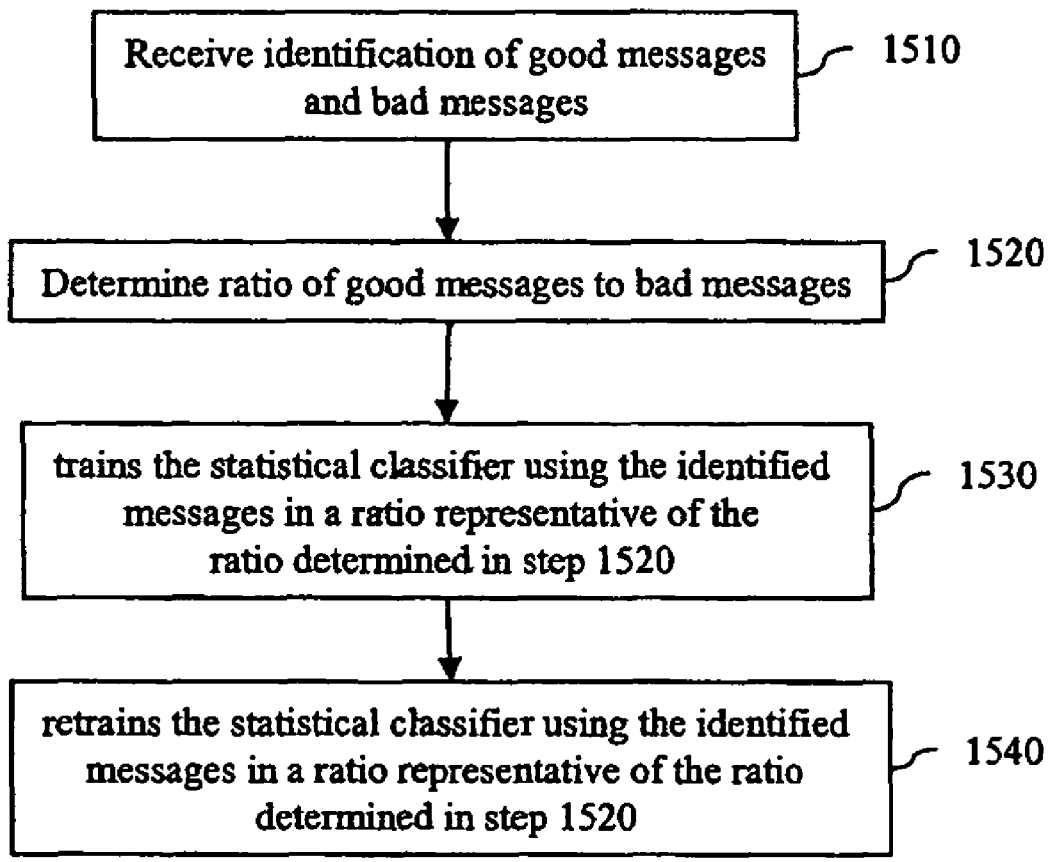
FIG. 15 depicts a flowchart of a method for bulk training, according to embodiments of the present invention.

In an embodiment, the filtering system supports a two-pass bulk training using a training ratio representative of the composition of the training set of message. FIG. 15 depicts a flowchart 1500 of a method for bulk training, according to embodiments of the present invention.

In step 1510, identification of a set of non-spam messages and a set of spam messages is received. In an embodiment, the user manually selects a set of messages and/or one or more folders as "non-spam" messages and a set of messages and/or one or more folders as "spam" messages via a provided interface.

In step 1520, the system determines the ratio of non-spam messages and spam messages. For example, if the user identifies 1000 non-spam messages and 2000 spam messages, the ratio is 1:2.

In step 1530, the system trains the statistical classifier using the identified messages in a ratio representative of the ratio determined in step 1520. In the example discussed in step 1520, the system trains using 1 non-spam message followed by 2 spam messages. This pattern is repeated until all identified messages have been processed. In an embodiment, the bulk training is train on error training. Step 1530 represents the first bulk training pass.

In step 1540, the system retrains the statistical classifier using the identified messages in a ratio representative of the ratio determined in step 1520. During this step messages which were incorrectly added to the database during the first bulk training pass are removed from the database. In this manner, unnecessary information is removed from the database.

2.4.2 Classifier Database Management

In an embodiment, the filtering system periodically purges old messages from the classifier database. Periodically cleaning out (also referred to as garbage collecting) the classifier database is important to keep the database size small for performance and redundancy reasons. In addition, this type of database management is also critical in order to keep pace with the changing techniques of the spammer and/or malicious message originator.

Spammers and/or malicious message originators continuously alter their techniques to avoid filtering and detection systems. The information that helped detect spam a few months ago often is not valuable to detect current techniques. Therefore, months old data stored in the database doesn't help the classifier system score any better and may actually be giving inaccurate scoring to certain messages.

Furthermore, the types of messages a user receives often change over time. For example, a user may change jobs, start a new project, or be working with a new customer. If the classifier database contains a majority of old messages, an unduly high percentage of received messages will be based on old data rather than current data.

Figure 16:
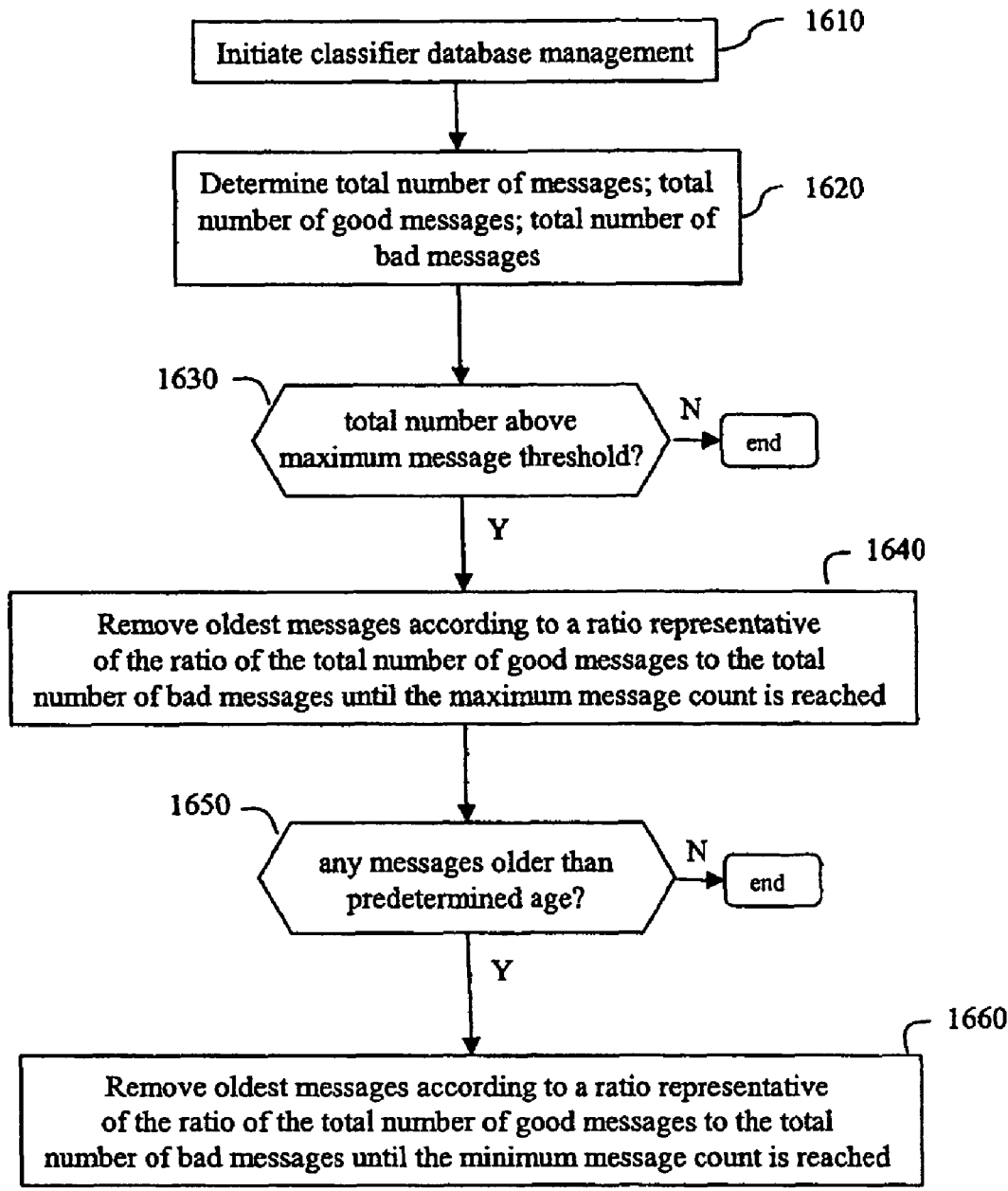
FIG. 16 depicts a flowchart of a method for managing the classifier database, according to embodiments of the present invention.

FIG. 16 depicts a flowchart 1600 of a method for managing the classifier database, according to embodiments of the present invention. Flowchart 1600 begins in step 1610 when classifier database management is initiated. In an embodiment, classifier database management is initiated periodically by the system. For example, database management may be initiated once a month, once every few weeks, or any other interval. Database management is typically initiated when the user's system is idle or not busy.

In step 1620, the total number of messages in the classifier database is determined. In addition, the total number of non-spam messages in the classifier database and the total number of spam messages in the classifier database are determined in this step.

In step 1630, a determination is made whether the total number of messages is above the maximum message threshold. The maximum message threshold represents the highest total number of messages desired for the classifier to operate according to specifications. In an embodiment, the maximum message threshold is user configurable. If the total number of messages is below the maximum message threshold, processing ends. If the total number of messages is above the maximum message threshold, operation proceeds to step 1640.

In step 1640, the oldest messages in the system are removed according to a ratio representative of the ratio of the total number of non-spam messages to the total number of spam messages until the maximum message count is reached. Each message has an associated age. In this step, messages are deleted based on their associated age. For example, assume a user has 6000 messages stored, 4000 non-spam messages and 2000 spam messages. The ratio of non-spam to spam messages is 2:1. In addition, assume that the maximum message threshold is 5000. The system must then remove at least 1000 messages. In this example, the system removes the two oldest non-spam messages, then the oldest spam message and repeats this pattern. Alternatively, the system removes the 667 oldest non-spam messages and the 333 oldest spam messages.

In step 1650, a determination is made whether any messages older than a predetermined age remain in the system. If older messages remain, operation proceeds to step 1660. If no older messages remain, processing ends.

In step 1660, the oldest messages in the system are removed according to a ratio representative of the ratio of the total number of non-spam messages to the total number of spam messages until the minimum message count is reached. The minimum message count represents the lowest number of total messages the classifier database has in order to operate according to specifications. In an embodiment, the minimum message count is user configurable.

In a further embodiment, the system removes tokens from the database that no longer effect scoring performed by the classifier database. As described above, a token represents the content of a message. A listing of the unique tokens is stored in the token table stored in classifier database 119. Each unique token has one or more scores reflecting how many non-spam messages, how many spam messages, and how many unknown messages with which the token is associated. When all of these scores reaches zero for a particular token, the token can be removed from the database because it is no longer associated with any stored messages.

2.5 Message Authentication

Existing user interfaces for indicating to a user that a received message has been authenticated (e.g., using any one of a number of techniques such as S/MIME, PGP, SPF, Sender ID, DomainKeys, Goodmail, Bonded Sender, etc.) is either non-existent or inadequate. For example, the existing interface in Outlook and Outlook Express for S/MIME messages displays to the user a red or blue ribbon with detailed information from the security certificates. The interface does not indicate what was authenticated. This presentation can be confusing for many users.

When the filtering system successfully authenticates a message, an indication of successful authentication is displayed to the user. In an embodiment, the display includes a picture of the sender along with the message. This picture can be displayed in the same area where the From, To, and Subject information is displayed. In addition to showing the picture, an indication of what was authenticated is provided. In an embodiment, this is a domain or e-mail address along with the word 'authenticated.' For example, if the message was from bob@bob.com and was authenticated with S/MIME, the indication would display a picture of Bob and show the text 'bob@bob.com authenticated.'

The sender of a message can communicate what picture to display in a number of different ways such as in an e-mail header with a URL, published in the DNS (for authentication methods that rely on the DNS), as an attachment, from a central database. Alternatively, the MUA can have a default algorithm to generate a URL from the authentication information. The user may also override what picture is shown via a local database mapping e-mail address and/or domains to pictures. The pictures may be pictures of people, company logos, etc.

If a message fails authentication or claims to be something that one of the authentication algorithms shows that is not, the message is discarded immediately without displaying the message to the user or quarantining the message. Alternatively, if the forged message is display, the display will include an indication of what was forged along with the word 'forged.' For messages that cannot be determined to be authentic or forged, no user interface is presented to the user.

2.6 SMTP Received Tagging

In an embodiment, a client leverages the anti-spam and authentication functionality of MTAs by reading mail headers written to the message by the MTA. Every MTA prepends a Received header to the message when it processes the message. By placing headers that the MTA wants to communicate to the client above the Received header that it writes, the client knows it can trust all headers above the Received header of any MTA that the client trusts.

A client typically trusts the last MTA in the chain because it is the user's mail server. Any headers written above the final Received header can therefore by trusted. If the destination MTA also trusts upstream MTAs, it can communicate this information to the client in a header above the final Received header. This information might be a server name, IP, or a count of the number of Received headers the client can trust.

3. Conclusion

It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for filtering messages received by a user, comprising:
    determining, in a message classification module, a score for a received message by analyzing a plurality of portions of a body of the received message, wherein each portion in the plurality of portions is scored with a portion score;
    determining a user-defined authoritative status for the received message, wherein step (b) comprises:
        (i) determining whether an address associated with a sender of the received message matches an entry on a positive screening list,
        (ii) assigning a non-spam user-defined authoritative status for the received message if the address associated with the sender matches an entry on the positive screening list,
        (iii) storing the received message in a quarantine folder if the address associated with the sender does not match an entry on the positive screening list,
        (iv) receiving a filtering status indication for the received message,
        (v) assigning a non-spam user-defined authoritative status for the received message if the filtering status indication indicates user approval of the message, and
        (vi) assigning a spam user-defined authoritative status for the received message if the filtering status indication indicates user disapproval of the message; and
    automatically training the message classification module when the score is inconsistent with the user-defined authoritative status.

2. The method of claim 1, wherein step (b) further comprises:
    (vii) determining whether an address associated with a sender of the received message matches an entry on a negative screening list; and
    (viii) assigning a spam user-defined authoritative status for the received message if the address associated with the sender matches an entry on the negative screening list.

3. The method of claim 1, further comprising:
    prior to step (a), initializing the classification module, wherein the initializing step includes:
    receiving an indication of a set of existing non-spam messages stored for the user and an indication of a set of existing spam messages stored for the user,
    determining a ratio of non-spam messages to spam messages,
    training the classification module using the indicated messages in a ratio representative of the ratio of non-spam to spam messages, and
    retraining the classification module using the indicated messages in a ratio representative of the ratio of non-spam to spam messages,
    wherein the retraining step removes redundant training information from the classification module.

4. The method of claim 1, further comprising:
    (d) initiating management of a database associated with the classification module;

(e) determining the total number of messages in the database, the total number of non-spam messages in the database, and the total number of spam messages in the database; and (f) removing the oldest messages from the database according to a ratio representative of the ratio of the total number of non-spam messages to the total number of spam messages until a maximum message count is reached.

5. The method of claim 4, further comprising:

(g) removing the oldest messages from the database according to a ratio representative of the ratio of the total number of non-spam messages to the total number of spam messages until a minimum message count is reached if messages older than a predetermined age remain after step (f).

6. The method of claim 1, wherein step (b) further comprises:

(vii) if a spam user-defined authoritative status is assigned to the message, sending a message to the sender to unsubscribe the user from a mailing list if the sender address is a mailing list header.

7. The method of claim 1, wherein the received message includes a plurality of sender addresses and a plurality of recipient addresses, and wherein step (b) further comprises:

(vii) applying a broad approval process to a received message having a non-spam user-defined authoritative status, wherein each sender address and each recipient address is added to the positive screening list during the broad approval process; and (vii) applying a broad approval process to a subsequently received message if a sender address in the subsequently received message matches an entry on the positive screening list.

8. The method of claim 1, wherein step (b) further comprises:

(vii) sorting a set of messages stored in the quarantine folder according to their associated scores.

9. The method of claim 8, wherein step (b) further comprises:

(vii) obscuring one or more messages having a score within a range indicating spam.

10. The method of claim 8, wherein step (b) further comprises:

(vii) hiding one or more messages having a score within a range indicating spam.

11. The method of claim 1, further comprising:
prior to step (b)
authenticating the received message; and
displaying a visual indication of the authentication,
wherein the visual indication of the authentication includes an image representative of the message sender.

12. The method of claim 11, wherein the image is a picture of the message sender.

13. The method of claim 11, wherein the visual indication further includes a description of what was authenticated.

14. The method of claim 1, wherein the portion score identifies a number of spam messages with which the portion is associated.

15. The method of claim 1, wherein the user-defined authoritative status is defined by a recipient of the received message.

16. The method of claim 1, wherein each portion score is calculated based on a categorization of each received message that includes each respective portion as a spam message or a non-spam message.

17. The method of claim 1, wherein each portion score is calculated based on a frequency of appearance of each portion in spam or non-spam messages.

18. A computer program product comprising a non-transitory computer useable medium including control logic stored therein, the control logic enabling the filtering of messages received by a user, and the control logic, if executed, causing a processor to perform operations comprising:

determining, in a message classification module, a score for a received message by analyzing a plurality of portions of a the body of the received message, wherein each portion in the plurality of portions is scored with a portion score;

determining a user-defined authoritative status for the received message;

determining whether an address associated with a sender of the received message matches an entry on a positive screening list; and assigning a non-spam user-defined authoritative status for the received message if the address associated with the sender matches an entry on the positive screening list;

storing the received message in a quarantine folder if the address associated with the sender does not match an entry on the positive screening list;

receiving a filtering status indication for the received message;

assigning a non-spam user-defined authoritative status for the received message if the filtering status indication indicates user approval of the message;

assigning a spam user-defined authoritative status for the received message if the filtering status indication indicates user disapproval of the message; and automatically training the classification module when the score is inconsistent with the user-defined authoritative status.

19. The computer program product of claim 18, wherein the operations further comprise:

determining whether an address associated with a sender of the received message matches an entry on a negative screening list; and assigning a spam user-defined authoritative status for the received message if the address associated with the sender matches an entry on the negative screening list.

20. The computer program product of claim 18, wherein the operations further comprise:

initializing the classification module, wherein initializing the classification module comprises:
receiving an indication of a set of existing non-spam messages stored for the user and an indication of a set of existing spam messages stored for the user,
determining a ratio of non-spam messages to spam messages,
training the classification module using the indicated messages in a ratio representative of the ratio of non-spam to spam messages, and
retraining the classification module using the indicated messages in a ratio representative of the ratio of non-spam to spam messages.

21. The computer program product of claim 18, wherein the operations further comprise:

initiating management of a database associated with the classification module;

determining the total number of messages in the database, the total number of non-spam messages in the database, and the total number of spam messages in the database; and removing the oldest messages from the database according to a ratio representative of the ratio of the total number of non-spam messages to the total number of spam messages until a maximum message count is reached.

22. A method for initializing a statistical classification module in a message filtering system, comprising:
  initializing a spam message classification module, wherein initializing the spam message classification module comprises:
    receiving a first indication by a message recipient of a set of existing non-spam messages stored for the message recipient and second indication by the message recipient of a set of existing spam messages stored for the message recipient,
    determining a ratio of the non-spam messages stored for the message recipient to the spam messages stored for the message recipient,
    training the spam message classification module to recognize spam messages and non-spam messages using a subset of the indicated messages, and
    removing redundant training information from the spam message classification module;
  receiving a third indication by the message recipient identifying a received message as spam or non-spam;
  determining that a spam classification error has occurred if a spam classification generated by the spam message classification module is inconsistent with the third indication; and
  in response to determining that the spam classification error has occurred, re-training the spam message classification module using the received message.

23. A method for filtering messages received by a first user, comprising:
  determining whether an address of a sender of a received message matches an entry on a positive screening list of a second human user, wherein the second human user is identified as trusted by the first user;
  if the address associated with the sender of the received message matches the entry, applying a broad approval process to the received message, wherein each sender address and each recipient address in a header of the received message is added to the positive screening list during the broad approval process; and
  applying the broad approval process to a subsequently received message if the sender address in the subsequently received message matches an entry on the positive screening list of the second human user.

24. The method of claim 23, further comprising:
  prior to step (a), storing a plurality of received message in a quarantine folder if the address associated with the sender of each message does not match an entry on the positive screening list.

25. The method of claim 24, further comprising:
  (d) applying an updated screening list to the plurality of received messages stored in the quarantine folder; and
  (e) adding a first quarantined received message to an inbox of the first user if the sender of the quarantined received message matches an entry in the updated screening list.

26. The method of claim 25, wherein step (e) further comprises:
  applying a broad approval process to the first quarantined received message wherein each sender address and each recipient address of the first quarantined message is added to the positive screening list; and
  applying the updated screening list to the remaining received messages stored in the quarantine folder.

27. A computer program product comprising a non-transitory computer useable medium including control logic stored therein, the control logic enabling the filtering of messages received by a first user, and the control logic, if executed, causing a processor to perform operations comprising:
  determining whether an address of a sender of a received message matches an entry on a positive screening list of a second human user, wherein the second human user is identified as trusted by the first user;
  applying a broad approval process to the received message, wherein each sender address and each recipient address in a header of the received message is added to the positive screening list during the broad approval process, if the address associated with the sender of the received messages matches an entry on the positive screening list; and
  applying the broad approval process to a subsequently received message if the sender address in the subsequently received message matches an entry on the positive screening list of the second human user.

28. The computer program product of claim 27, wherein the operations further comprise:
  storing a plurality of received messages in a quarantine folder if the address associated with the sender of each message does not match an entry on the positive screening list.

29. The computer program product of claim 28, wherein the operations further comprise:
  applying an updated screening list to the plurality of received messages stored in the quarantine folder; and
  adding a first quarantined received message to an inbox of the first user if the sender of the quarantined received message matches an entry in the updated screening list.

30. The computer program product of claim 29, wherein the operations further comprise:
  applying a broad approval process to the first quarantined received message wherein each sender address and each recipient address of the first quarantined message is added to the positive screening list; and
  applying the updated screening list to the remaining received messages stored in the quarantine folder.

31. A method for filtering messages received by a user, comprising:
  determining, in a content analysis engine, a score for each received message by analyzing a plurality of portions of a body of each received message, wherein each portion in the plurality of portions is associated with a portion score;
  determining whether an address associated with a sender of each received message matches an entry on a positive screening list;
  storing a set of received messages in a quarantine folder if the address associated with the sender of each message in the set of received messages does not match an entry on the positive screening list; and
  sorting the set of received messages stored in the quarantine folder according to their associated scores.

32. The method of claim 31, further comprising:
  (e) obscuring one or more messages in the set of received messages having a score within a range indicating spam.

33. The method of claim 31, further comprising:
  (e) hiding one or more messages in the set of received messages having a score within a range indicating spam.

34. A computer program product comprising a non-transitory computer useable medium including control logic stored therein, the control logic enabling the filtering of messages received by a user, and the control logic, if executed, causing a processor to perform operations comprising:
   determining a score for each received message by analyzing a plurality of portions of a body of each received message, wherein each portion in the plurality of portions is scored with a portion score;
   determining whether an address associated with a sender of each received message matches an entry on a positive screening list;
   storing a set of received messages in a quarantine folder if the address associated with the sender of each message in the set of received messages does not match an entry on the positive screening list; and
   sorting the set of received messages stored in the quarantine folder according to their associated scores.

35. The computer program product of claim 34, wherein the operations further comprise:
   obscuring one or more messages in the set of received messages having a score within a range indicating spam.

36. The computer program product of claim 34, wherein the operations further comprise:
   hiding one or more messages in the set of received messages having a score within a range indicating spam.

* * * * *